(12) United States Patent
Ohtsuji et al.

(10) Patent No.: US 12,374,203 B2
(45) Date of Patent: Jul. 29, 2025

(54) TRACKING SUPPORT APPARATUS, TERMINAL, TRACKING SUPPORT SYSTEM, TRACKING SUPPORT METHOD AND PROGRAM

(71) Applicant: NEC Corporation, Tokyo (JP)

(72) Inventors: Taichi Ohtsuji, Tokyo (JP); Kazushi Muraoka, Tokyo (JP); Hiroaki Aminaka, Tokyo (JP); Dai Kanetomo, Tokyo (JP); Norio Yamagaki, Tokyo (JP); Takashi Yoshinaga, Tokyo (JP)

(73) Assignee: NEC CORPORATION, Tokyo (JP)

( * ) Notice: Subject to any disclaimer, the term of this patent is extended or adjusted under 35 U.S.C. 154(b) by 41 days.

(21) Appl. No.: 18/243,884

(22) Filed: Sep. 8, 2023

(65) Prior Publication Data

US 2023/0419798 A1 Dec. 28, 2023

Related U.S. Application Data

(63) Continuation of application No. 18/212,908, filed on Jun. 22, 2023, which is a continuation of application
(Continued)

(51) Int. Cl.
*G06T 7/292* (2017.01)
*G06V 20/52* (2022.01)
(Continued)

(52) U.S. Cl.
CPC ........ *G08B 13/19608* (2013.01); *G06T 7/292* (2017.01); *G06V 20/52* (2022.01);
(Continued)

(58) Field of Classification Search
None
See application file for complete search history.

(56) References Cited

U.S. PATENT DOCUMENTS 6,970,183 B1 * 11/2005 Monroe ................ G08B 7/062
348/143
9,191,633 B2 11/2015 Fujimatsu et al.
(Continued)

FOREIGN PATENT DOCUMENTS

JP 2002-290962 A 10/2002
JP 2003-289532 A 10/2003
(Continued)

OTHER PUBLICATIONS

JP Office Action for JP Application No. 2023-212230, mailed on Jun. 25, 2024 with English Translation.
(Continued)

*Primary Examiner* — Christopher G Findley
(74) *Attorney, Agent, or Firm* — Sughrue Mion, PLLC

(57) ABSTRACT

A tracking support system includes a position calculating section connected with a plurality of cameras arranged in a predetermined monitoring area to transmit video images imaged by the plurality of cameras and configured to calculate a position of the tracking target based on the video images received from the plurality of cameras; a tracker selecting section configured to select a tracker to be instructed to track the tracking target, based on position information of the terminal received from the terminal and the calculated position of the tracking target; and an information transmitting section configured to transmit information of a distance between the tracking target and the terminal during the tracking of the tracking target to the terminal carried by the selected tracker.

15 Claims, 31 Drawing Sheets

Related U.S. Application Data

No. 17/148,747, filed on Jan. 14, 2021, now Pat. No. 11,727,775, which is a continuation of application No. 16/472,688, filed as application No. PCT/JP2017/008263 on Mar. 2, 2017, now Pat. No. 11,049,374.

(60) Provisional application No. 62/437,742, filed on Dec. 22, 2016.

(51) Int. Cl.
  *G08B 13/196* (2006.01)
  *G08B 25/00* (2006.01)

(52) U.S. Cl.
  CPC . *G08B 13/19613* (2013.01); *G08B 13/19645* (2013.01); *G08B 25/009* (2013.01); *G06T 2207/30232* (2013.01)

(56) References Cited

U.S. PATENT DOCUMENTS

| | | |
|---|---|---|
| 10,162,353 B2 | 12/2018 | Hammond |
| 10,810,889 B2 | 10/2020 | Ogawa |
| 2003/0202102 A1 | 10/2003 | Shiota et al. |
| 2005/0280711 A1 | 12/2005 | Ishii et al. |
| 2011/0181712 A1 | 7/2011 | You et al. |
| 2014/0169663 A1 | 6/2014 | Han et al. |
| 2014/0285659 A1 | 9/2014 | Kim et al. |
| 2015/0015718 A1* | 1/2015 | Fujimatsu .............. H04N 7/181 349/159 |
| 2015/0248751 A1 | 9/2015 | Ebiyama et al. |
| 2015/0356840 A1 | 12/2015 | Wang et al. |
| 2016/0031416 A1 | 2/2016 | Calhou et al. |
| 2016/0291593 A1 | 10/2016 | Hammond et al. |
| 2016/0304217 A1 | 10/2016 | Fisher et al. |
| 2017/0092109 A1 | 3/2017 | Trundle et al. |
| 2017/0287301 A1 | 10/2017 | Taylor et al. |
| 2017/0352250 A1 | 12/2017 | de Barros Chapiewski et al. |
| 2018/0158298 A1 | 6/2018 | Jeong et al. |
| 2018/0173220 A1 | 6/2018 | Wang |
| 2018/0239953 A1 | 8/2018 | Miwa |
| 2020/0310468 A1 | 10/2020 | Liu |

FOREIGN PATENT DOCUMENTS

| | | |
|---|---|---|
| JP | 2004-328484 A | 11/2004 |
| JP | 2005-086360 A | 3/2005 |
| JP | 2005-348157 A | 12/2005 |
| JP | 2009-003852 A | 1/2009 |
| JP | 2011-018094 A | 1/2011 |
| JP | 2012-078950 A | 4/2012 |
| JP | 2012-104022 A | 5/2012 |
| JP | 2014-031118 A | 2/2014 |
| JP | 2014-199548 A | 10/2014 |
| JP | 2015-002553 A | 1/2015 |
| JP | 2015-019248 A | 1/2015 |
| JP | 2015-207149 A | 11/2015 |
| JP | 5871296 B1 | 3/2016 |
| JP | 2016-119627 A | 6/2016 |
| JP | 2016-171442 A | 9/2016 |
| JP | 2016-194759 A | 11/2016 |
| KR | 10-2012-0126680 A | 11/2012 |
| WO | 2013/125301 A1 | 8/2013 |

OTHER PUBLICATIONS

US Office Action for U.S. Appl. No. 18/212,908, mailed on Oct. 10, 2024.
JP Office Action for JP Application No. 2023-212230, mailed on Nov. 26, 2024 with English Translation.
JP Official Communication for JP Application No. 2023-001498, mailed on Nov. 28, 2023 with English Translation.
US Office Action for U.S. Appl. No. 18/368,618, mailed on Dec. 27, 2024.
International Search Report for PCT/JP2017/008263 dated May 23, 2019 [PCT/ISA/210].
Japanese Office Action for JP Application No. 2021-096083 mailed on Jun. 28, 2022 with English Translation.
US Notice of Allowance for U.S. Appl. No. 18/472,888 mailed on Feb. 11, 2021.

* cited by examiner

FIG. 6

| TRACKER ID | CURRENT POSITION | CURRENT TIME | OUTER APPEARANCE INFORMATION | SKILL INFORMATION | TRACKING SUPPORT TERMINAL ADDRESS | ... |
|---|---|---|---|---|---|---|
|  |  |  |  |  |  |  |

FIG. 7

| TRACKING TARGET ID | CURRENT POSITION | CURRENT TIME | FEATURE INFORMATION 1 | FEATURE INFORMATION 2 | ... |
|---|---|---|---|---|---|
|  |  |  |  |  |  |

TRACKING SUPPORT APPARATUS, TERMINAL, TRACKING SUPPORT SYSTEM, TRACKING SUPPORT METHOD AND PROGRAM

DESCRIPTION OF RELATED APPLICATION

The present application is a continuation of U.S. patent application Ser. No. 18/212,908 (filed on Jun. 22, 2023), which is a continuation of U.S. patent application Ser. No. 17/148,747 (filed on Jan. 14, 2021), now U.S. Pat. No. 11,727,775, which is a continuation of U.S. patent application Ser. No. 16/472,688 (filed on Jun. 21, 2019), now U.S. Pat. No. 11,049,374, which is National Stage Entry of International Patent Application No. PCT/JP2017/008263 (filed on Mar. 2, 2017), which claims priority based on U.S. Provisional Application 62/437,742 (filed on Dec. 22, 2016), the disclosure of which are incorporated herein by reference.

FIELD

The present invention relates to a tracking support apparatus, a terminal, a tracking support system, a tracking support method and a program, and especially, to a tracking support system, a tracking support method and a program, in which a support is provided for a tracker tracking a tracking target.

BACKGROUND

Patent Literature 1 discloses a security patrol support system in which a security guard who heads for the scene where an extraordinary event occurred can easily specify a suspicious person in a patrol guard service. Specifically, the security patrol support system includes a person monitoring section 100 which detects a person contained in video image data imaged by an imaging section arranged in a predetermined security area and monitors the detected person, a suspicious person detecting section 101 which detects a person satisfying a predetermined detection condition as a suspicious person, a position information calculating section 102 which calculates relative position information between the security guard and the suspicious person detected by the suspicious person detecting section 101, and a suspicious person information transmitting section 103 which transmits predetermined information to a mobile terminal carried by the security guard based on the relative position information calculated by the position information calculating section 102.

Patent Literature 2 discloses a monitoring system which can output an instruction for an object quickly and properly when the object such as a suspicious person and a suspicious thing is detected. Specifically, in Patent Literature 2, a monitoring server 2 of the monitoring system stores a mobile terminal position managing table used to manage the positions of the mobile terminals 3 for every mobile terminal 3. Also, the monitoring server 2 stores an extraordinary state classification table in which there is registered a condition to determine the mobile terminal 3 to which an instruction for the object is to be issued, for every item corresponding to a kind of extraordinary state of the object. When the detection of the object in an extraordinary state is notified from the monitoring camera terminal 1, the monitoring server 2 determines the mobile terminal 3 to which the instruction for the object should be issued, by using the mobile terminal position managing table and the extraordinary state classification table. The monitoring server 2 transmits the instruction for the object in the extraordinary state to the determined mobile terminal 3.

Patent Literature 3 discloses a configuration in which a central monitoring apparatus (20) acquires monitoring information which contain position information outputted from a monitoring terminal (10) at least, sets a monitoring point where the existence of a tracking target to be tracked by a tracker is estimated, selects the monitoring terminal (10) for a moving object which approaches and/or leaves a predetermined monitoring area with respect to the set monitoring point, and output an image transmission instruction to the selected monitoring terminal (10) so as to transmit the monitoring information containing image information.

Patent Literature 4 discloses a detecting apparatus and a detecting method, in which it is possible to detect position information of a specific target and to ask a third party in the neighborhood of the specific object to secure the specific object.

Patent Literature 5 discloses a tracking support apparatus which can reduce the load of a monitoring member carrying out the monitoring at a central control room and a security room.

Patent Literature 6 discloses a configuration in which a security guard G1 takes a sight in the neighborhood of him by a wearable camera, and asks a managing apparatus 10 to collate a person contained in the image data, and the managing apparatus 10 informs security information if the person contained in the image data is a person H1.

[Patent Literature 1] JP2011-18094A
[Patent Literature 2] JP2012-104022A
[Patent Literature 3] WO2013/125301A1
[Patent Literature 4] JP2009-3852A
[Patent Literature 5] JP2015-19248A
[Patent Literature 6] JP2016-194759A

SUMMARY

According to the configurations of Patent Literatures 1 to 3, it becomes possible for the security guard and so on to come running to a site to deal with a suspicious person and an extraordinary event. However, often, the suspicious person notices the security guard and runs away. On the other hand, Patent Literature 4 has as a purpose, the search of a lost child, and does not assume the situation that the child runs away. Also, the tracking in Patent Literatures 5 and 6 is to trace a person in video images of a fixed camera with the eyes, and a security guard does not track actually.

The present invention has as an object, to provide a tracking support apparatus, a terminal, a tracking support system, a tracking support method and a program, that can contribute to enrichment of means for supporting a tracker such as a security guard so that the tracker can track in such a manner that a tracking target such as the above suspicious person is difficult to notice the tracking.

According to a first aspect, a tracking support apparatus is provided that has a position calculating section connected with a plurality of cameras which are arranged in a predetermined monitoring area to transmit video images imaged by the plurality of cameras, and configured to calculate a position of a tracking target based on the video images received from the plurality of cameras. The tracking support apparatus further includes a tracker selecting section configured to select a tracker to be instructed to track the tracking target, based on position information (or data) of a terminal received from the terminal and the calculated position information (or data) of the tracking target. More-over, the tracking support apparatus further includes an information transmitting section configured to transmit information of a distance between the tracking target and the terminal carried by the tracker tracking the tracking target to the terminal of the selected tracker.

According to a second aspect, a terminal is provided that has an instruction receiving section configured to receive an instruction about a tracking target from a tracking support apparatus, which transmits the instruction to the tracker carrying the terminal, based on information received from a plurality of cameras that are arranged in a predetermined monitoring area to transmit video images imaged by the plurality of cameras, and an outputting section configured to output information of a distance between its own terminal and the tracking target based on a position of the tracking target received from the tracking support apparatus and a position of its own terminal.

According to a third aspect, there is provided a tracking support method performed by a tracking support apparatus in a tracking support system that has a plurality of cameras arranged in a predetermined monitoring area to transmit video images imaged by the plurality of cameras, and a tracking support apparatus configured to transmit an instruction to a tracker carrying a terminal based on information received from terminals carried by a plurality of trackers and the cameras. The tracking support method is provided in which the tracking support apparatus calculates a position of a tracking target based on the video images received from the plurality of cameras, selects the tracker to be instructed to track the tracking target, based on position information of the terminal received from the terminal and the calculated position of the tracking target, and transmits information of a distance between the tracking target and the terminal during tracking the tracking target to the terminal of the selected tracker. This method is coupled to a computer to instruct the tracking of the tracking target to the terminal carried by the tracker, as a specific machine.

According to a fourth aspect, a program is provided to make a computer, installed in a tracking support apparatus of a tracking support system which has a plurality of cameras arranged in a predetermined monitoring area to transmit video images imaged by the plurality of cameras, and the tracking support apparatus configured to transmit an instruction to a tracker carrying a terminal based on information received from the cameras and the terminals carried by a plurality of trackers, execute:
  processing of calculating a position of the tracking target based on the video images received from the plurality of cameras,
  processing of selecting the tracker to be instructed to track the tracking target, based on position information of the terminal received from the terminal and the calculated position of the tracking target, and
  processing of transmitting information of a distance between the tracking target and the terminal during the tracking of the tracking target to the terminal of the selected tracker.

According to a fifth aspect, a program is provided which makes a computer that is installed in a terminal receiving an instruction about a tracking target from a tracking support apparatus which transmits the instruction about the tracking target to a tracker carrying the terminal based on information received from a plurality of cameras arranged in a predetermined monitoring area to transmit video images imaged by the plurality of cameras, execute: processing of calculating a distance between its own terminal and the tracking target based on a position of the tracking target received from the tracking support apparatus and a position of its own terminal, and processing of outputting information of the calculated distance. The program can be stored in a (non-transitory) storage medium readable by a computer. That is, the present invention can be embodied as a computer program product.

According to a sixth aspect, a tracking support system is provided to include a plurality of cameras arranged in a predetermined monitoring area to transmit video images imaged by the plurality of cameras and the above tracking support apparatus.

According to the present invention, it becomes possible to support a tracker such as a security guard so as to be able to track in such a manner that a tracking target such as a suspicious person is difficult to notice the tracking.

BRIEF DESCRIPTION OF THE DRAWINGS

FIG. 6 is a diagram showing an example of tracker information held by the support server according to the first exemplary embodiment of the present invention.

FIG. 7 is a diagram showing an example of monitoring target information held by the support server according to the first exemplary embodiment of the present invention.

PREFERRED MODES

Figure 1:
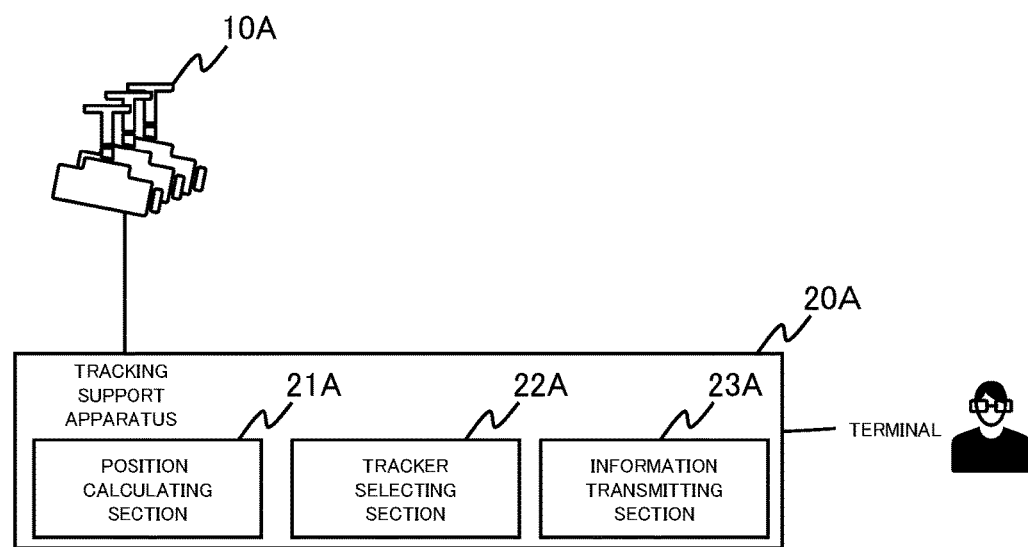
FIG. 1 is a diagram showing the configuration of an exemplary embodiment of the present invention.

First, the overview of an exemplary embodiment of the present invention will be described with reference to the attached drawings. Note that reference numerals in the drawings used in this overview are added to elements as an example for convenience to help understanding. The reference numerals are not used to intend to limit the present invention to the illustrated exemplary embodiments. An interblock connection line in the drawing to be referred to in the following description contains both of a bidirectional line and a mono-directional line. A one-way arrow schematically shows a flow of a main signal (data), but the bidirectional transmission is not excluded.

As shown in FIG. 1, the present invention can be realized by a tracking support system which contains a plurality of cameras 10A arranged in a predetermined monitoring area to transmit video images imaged by them, terminals (hereinafter, to be also referred to as tracking support terminals) respectively carried by a plurality of tracking mission workers (to be simply referred to as "trackers", hereinafter), and a tracking support apparatus 20A which transmits instructions to the trackers carrying the terminals based on information received from the terminals and the cameras 10A, in an exemplary embodiment.

More specifically, the tracking support apparatus 20A of the tracking support system has a position calculating section 21A configured to calculate a position of a tracking target person (to be simply referred to as "a tracking target" or "monitoring target", hereinafter) based on the video images received from the plurality of cameras, a tracker selecting section 22A configured to select a tracker tracking the tracking target based on position information (or data) of the terminal received from the terminal and the calculated position of the tracking target, an information transmitting section 23A configured to transmit to the terminal of the selected tracker, information of a distance between the terminal and the tracking target during tracking of the tracking target. The information of the distance between the terminal and the tracking target may be displayed as a distance simply in a numerical value or may be level-displayed to show the distance in the number of elements, by setting one unit element having a unit of 3 m, etc. Regarding the information of the distance between the terminal and the tracking target, an example may be adopted in which an approach warning is outputted by using images, vibration and so on, when the terminal approaches the tracking target too much, as described later.

Figure 2:
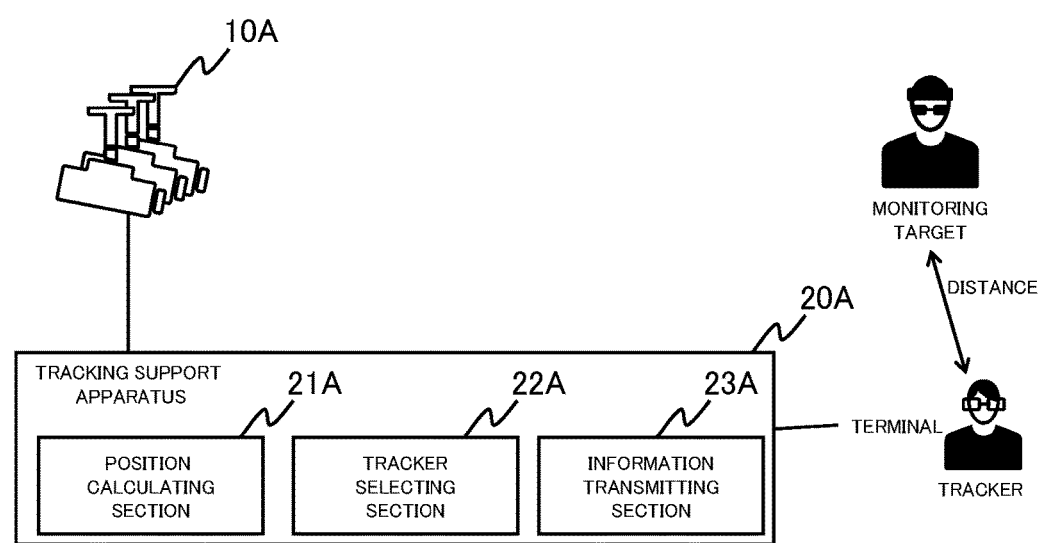
FIG. 2 is a diagram showing the operation of the exemplary embodiment of the present invention.

By adopting the above-mentioned configuration, as shown in FIG. 2, the tracking support apparatus 20A of the tracking support system transmits the distance to the tracking target to the terminal of the selected tracker. The tracker carries out the tracking while maintaining an appropriate distance, by referring to the information of the distance displayed on the carried terminal.

As mentioned above, according to the present invention, it is possible to check the distance (a suitable interval) to the tracking target without watching the tracking target. Therefore, it is possible to track the tracking target in such a manner that for the tracking target it is difficult to notice the tracker.

When the tracker selecting section 22A selects the tracker, a method can be adopted in which the movement of the tracking target and the movements of the trackers are estimated, and the tracker nearest to the tracking target is selected at each time. Of course, at that time, it is possible to totally determine the tracker, taking into account the outer appearance of each tracker (clothes, physique, colors of hair and skin, sexuality and so on), skills (walking speed, language, specialty and so on), machineries and materials carried by the tracker, experience, a fatigue degree and a tracking time until now.

First Exemplary Embodiment

Figure 3:
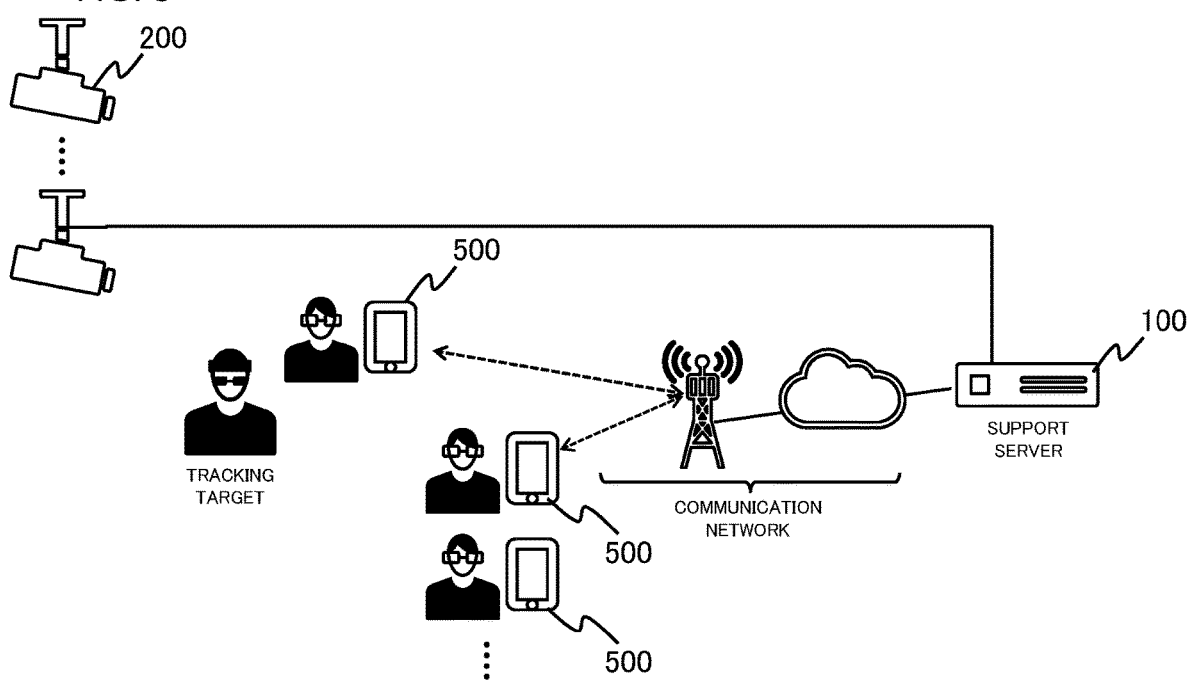
FIG. 3 is a diagram showing the configuration of a tracking support system according to a first exemplary embodiment of the present invention.

Next, a first exemplary embodiment of the present invention will be described in detail with reference to the drawings. FIG. 3 is a diagram showing the configuration of the tracking support system according to the first exemplary embodiment of the present invention. Referring to FIG. 3, the configuration is shown in which a support server 100 receiving images from a plurality of cameras 200 and tracking support terminals 500 carried by the plurality of trackers are connected through a communication network. In the present exemplary embodiment, the plurality of trackers track the tracking target based on instructions from the support server 100 while taking over the tracking, in the above configuration.

Figure 4:
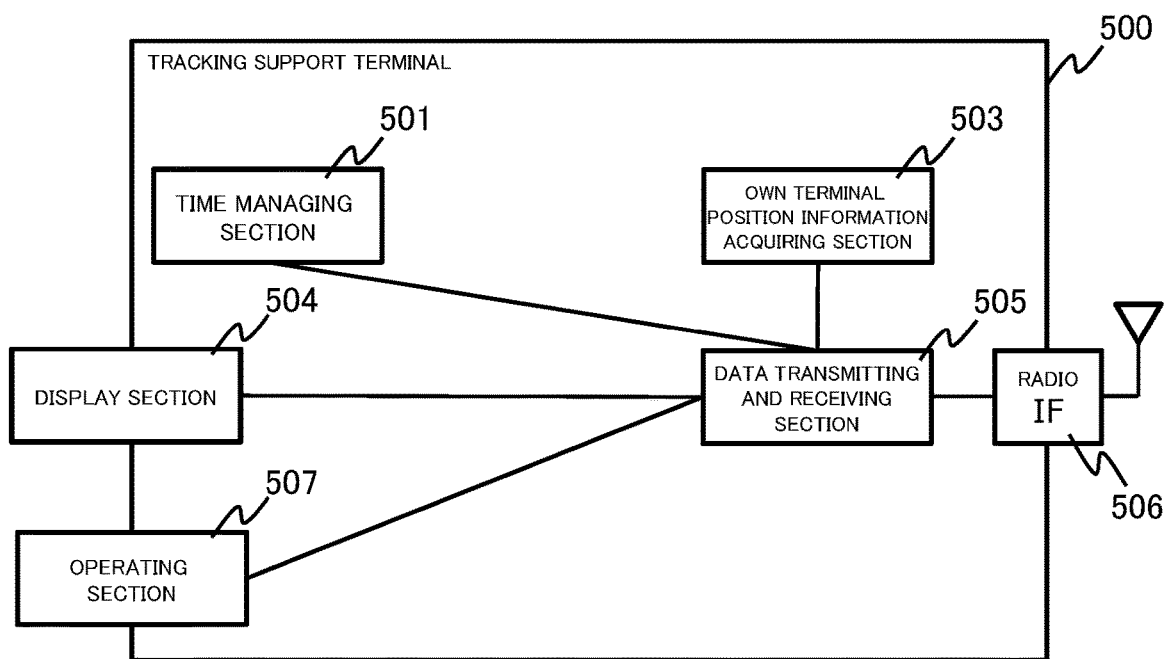
FIG. 4 is a diagram showing the configuration of a tracking support terminal according to the first exemplary embodiment of the present invention.

FIG. 4 is a diagram showing the configuration of the tracking support terminal 500 according to the first exemplary embodiment of the present invention. Referring to FIG. 4, the configuration is shown which includes a time managing section 501, an own terminal position information acquiring section 503, a display section 504, a data transmitting and receiving section 505, a radio interface (hereinafter, to be referred to as "a radio IF") 506, and an operation section 507.

The time managing section 501 has a clock device (timer) and manages the time. When the position information is transmitted to the support server 100, time information is transmitted together with the position information.

The own terminal position information acquiring section 503 acquires position information showing the position of the own terminal by positioning by use of a satellite positioning system such as GPS (Global Positioning System).

The display section 504 displays tracking support information and warnings such as an approach warning which are received from the support server 100. The approach warning is not limited to an example of displaying characters and images. For example, the approach warning can be informed by sound and vibration. In such a case, instead of the display section 504, the approach warning is outputted by a speaker and a vibrator. Also, the characters and images may be used together with sound and vibration.

The data transmitting and receiving section 505 communicates with the support server 100 through the radio IF 506. Specifically, the data transmitting and receiving section 505 transmits the position information of the own terminal and messages showing the start and end of tracking to the support server 100. Also, when receiving instructions and approach warnings from the support server 100, the data transmitting and receiving section 505 transmits the instructions and the approach warnings to the display section 504. The radio IF 506 and the data transmitting and receiving section 505 are equivalent to the above-mentioned instruction receiving section, and the data transmitting and receiving section 505 and the display section 504 are equivalent to the above-mentioned output section.

The operation section 507 is configured from a touch-panel and buttons receiving various instructions from an operating tracker.

Figure 14:
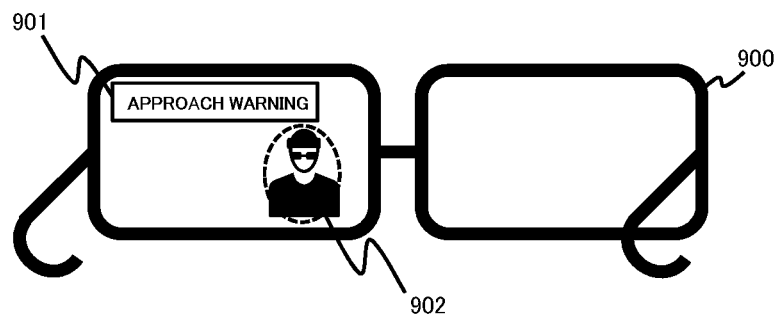
FIG. 14 is a diagram showing an example of approach warning displayed on the tracking support terminal according to the first exemplary embodiment of the present invention.
Figure 15:
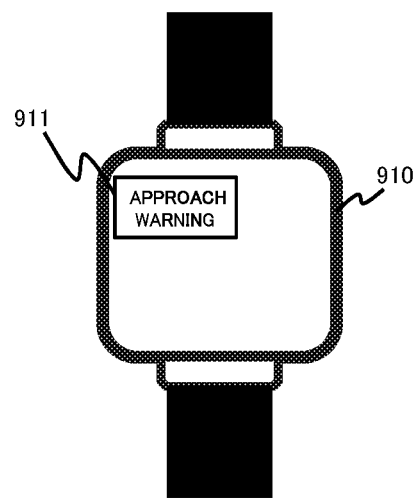
FIG. 15 is a diagram showing another example of approach warning displayed on the tracking support terminal according to the first exemplary embodiment of the present invention.

As the above-mentioned tracking support terminal 500, a smart phone and various wearable terminals with a position measurement function can be desirably used (reference to FIG. 14 and FIG. 15).

Figure 5:
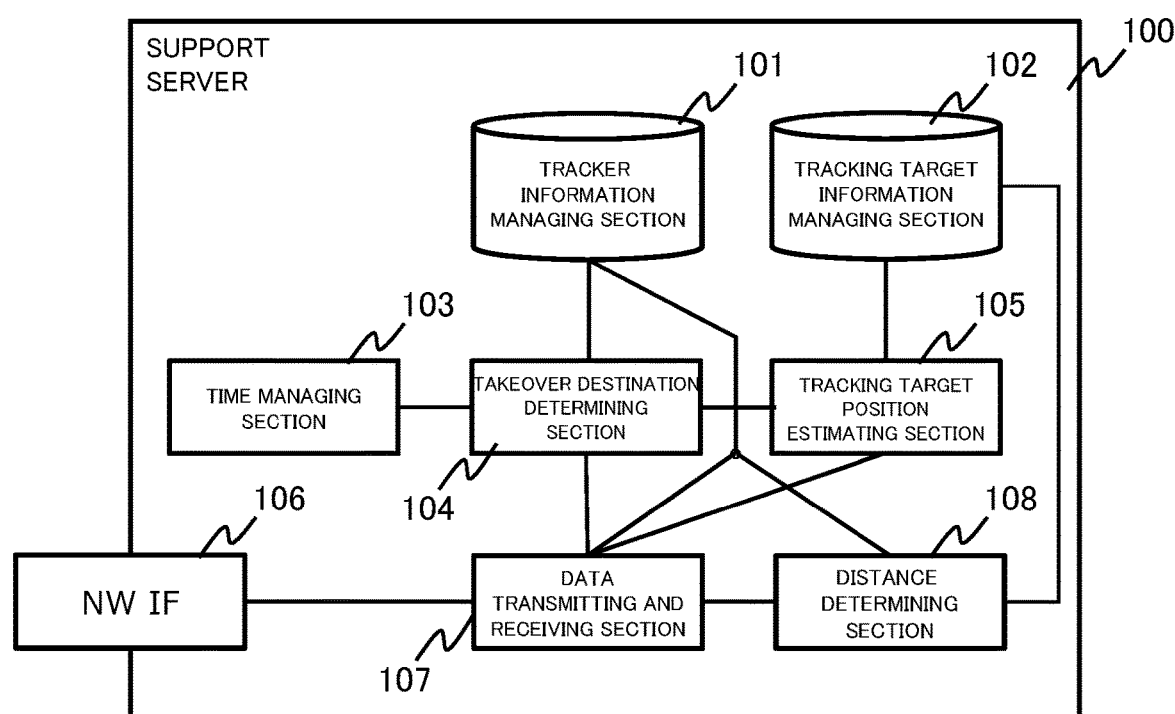
FIG. 5 is a diagram showing the configuration of a support server according to the first exemplary embodiment of the present invention.

Next, the configuration of the support server 100 will be described that is equivalent to the above tracking support apparatus that supports the tracking by grasping the position of the above tracking support terminal 500 and outputting the tracking instructions and the approach warnings. FIG. 5 is a diagram showing the configuration of the support server 100 according to the first exemplary embodiment of the present invention. Referring to FIG. 5, the configuration is shown that includes a tracker information managing section 101, a tracking target information managing section 102, a time managing section 103, a takeover destination determining section 104, a tracking target position estimating section 105, a network interface (hereinafter, to be referred to as "NW IF") 106, a data transmitting and receiving section 107, and a distance determining section 108.

The tracker information managing section 101 manages information of the trackers which track the tracking target.

FIG. 6 is a diagram showing an example of tracker information held by the tracker information managing section 101. In the example of FIG. 6, the tracker information is shown in which a current position, outer appearance information, skill information of each tracker specified by a tracker ID and an address of a tracking support terminal carried by the tracker and so on are related to each other. In a current position information field and a current time information field, information showing the current position of the tracker (e.g. latitude & longitude information) and a time when the tracker was in the position are stored. Also, as the outer appearance information, information of clothes, physique, colors of hair and skin, sexuality and so on of the tracker are stored. Also, walking speed, languages, and specialty and so on are stored as the skill information. In the field of address of tracking support terminal, a terminal address used to transmit messages and information to the tracking support terminal is stored. Also, although being omitted in an example of FIG. 6, the machineries and materials held by the tracker, the experience, the fatigue degree, the tracking time until now and so on may be recorded as status information. These pieces of information are referred to when the takeover destination determining section 104 selects the trackers to carry out the tracking. The contents of the above tracker information managing section 101 are enough to be set by an operation person who manages the trackers. Of course, each tracker may update items which are more desirable to be changed in real time.

Also, information of a person and so on as a tracking target is stored in the tracking target information managing section 102. FIG. 7 is a diagram shows an example of tracking target information held by the tracking target information managing section 102. In the example of FIG. 7, the following information is recorded for each tracking target specified by a tracking target ID: position information (current position), time information when the tracking target was in the position, and at least one item of feature information of the tracking target. As the feature information, for example, features such as clothes, colors of hair and skin, standing height, sexuality and so on of the tracking target are desirably adopted. Also, information usable as the feature information is not limited to the features of outer appearances of the tracking target. For example, if a terminal ID transmitted in radio from a terminal carried by the tracking target, voice (features of voice) and a used language and so on are known, these types of information can be used supplementary.

Also, the time managing section 103 has a time counting device (a timer) and records and manages a tracking start time, a tracking continuation time and so on of each tracking target.

The takeover destination determining section 104 determines a new tracker to start the tracking newly, instead of the tracker on tracking the tracking target at a predetermined event. More specifically, the takeover destination determining section 104 selects the new tracker to start the tracking newly based on the tracking target information held by the tracking target information managing section 102 and the tracker information held by the tracker information managing section 101. As the selection reference of the tracker, the outer appearance, skill and status information of the tracker are used in addition to the current position of the tracker showing that the tracker can start the tracking of the tracking target. For example, a person of the clothes and sexuality different from those of the tracker being tracking currently can be selected, and if the moving speed of the tracking target is fast, a person who is fast in walking speed and is low in a fatigue level can be selected as a tracker. Also, if it is known that the tracking target has strong wariness, a tracker having an attribute which is not conspicuous in an area where the tracking is carried out can be selected. Also, the attribute of the tracker may be determined previously based on the attribute of the tracking target.

The tracking target position estimating section 105 acquires the position of the tracking target based on the images received from the camera(s) 200 to output to the distance determining section 108. For example, the position of the tracking target is possible to calculate based on the position of the camera 200 and the position and size of the tracking target in each imaged image. Also, even when the tracking target has disappeared from the imaged images, the tracking target position estimating section 105 may estimate and output the position of the tracking target, if it can be seen from the imaged images that the tracking target advances in certain direction at a uniform velocity. As a method of detecting the tracking target and estimating the position thereof, various methods can be used. For example, the methods described in the above Patent Literatures (e.g. Patent Literature 6) can be used.

The data transmitting and receiving section 107 transmits a tracking instruction to a tracking support terminal 500 of a new tracker to start the tracking newly through the network IF (NW I/F) 106, and instructs a tracking end to a tracking support terminal 500 of the tracker who ends the tracking. Also, the data transmitting and receiving section 107 receives a tracking start report, a tracking end report, the position information of the tracking support terminal, a tracking start time and so on that are transmitted from the tracking support terminal 500 of the tracker through the radio IF 106.

The distance determining section 108 transmits the approach warning to a tracking support terminal 500 through the data transmitting and receiving section 107 when it is determined from the position of the tracking target estimated by the tracking target position estimating section 105 and the position of the tracker that the distance between the tracking target and the tracker is less than a predetermined threshold.

Note that each section (a processing section) of the tracking support terminal 500 and support server 100 shown in FIG. 4 and FIG. 5 can be realized by making a processor as hardware loaded into these devices execute a computer program for the above processing.

Figure 8:
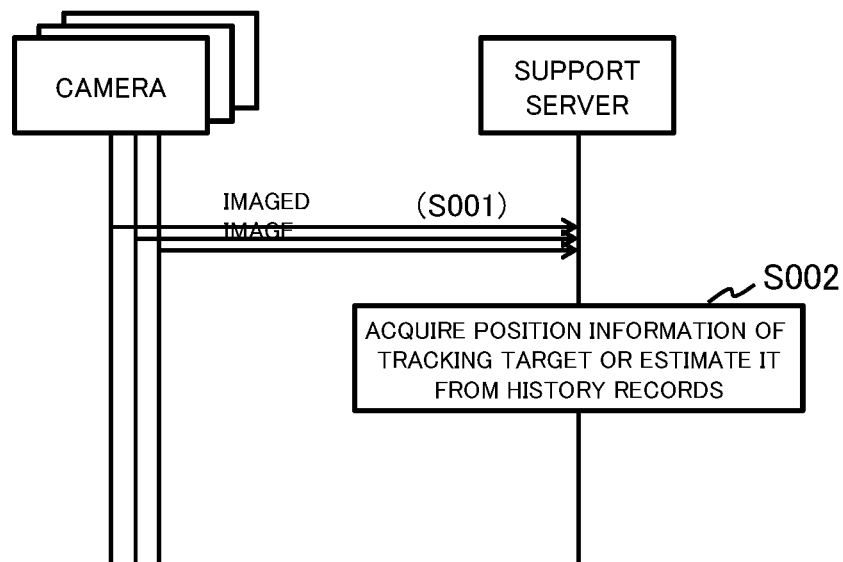
FIG. 8 is a flow chart showing the operation (transmission processing of images to the support server) of a camera according to the first exemplary embodiment of the present invention.

Subsequently, the operation of the present exemplary embodiment will be described in detail with reference to the drawings. First, a mechanism by which the support server 100 specifies the position of the tracking target will be described. FIG. 8 is a sequence diagram showing an operation of the camera according to the first exemplary embodiment of the present invention (transmission processing of the imaged image to the support server). Referring to FIG. 8, the camera 200 transmits the imaged image to the support server 100 in a predetermined time interval (Step S001).

The support server 100 acquires the position information from the imaged image received from the camera 200 (Step S002). As mentioned above, the position of the tracking target can be calculated based on the position of the camera 200 and the position and size of the tracking target in the imaged image. Also, when the tracking target has disappeared from the image imaged by the camera, the position of the tracking target may be estimated from the movement of the tracking target in past.

Figure 9:
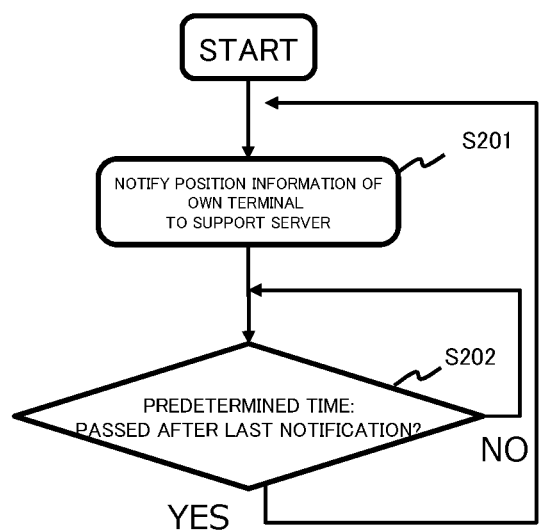
FIG. 9 is a flow chart showing the operation (processing of position notification to the support server) of a tracking support terminal according to the first exemplary embodiment of the present invention.

Next, the transmission processing of the position information to the support server 100 from the tracking support terminal 500 will be described. FIG. 9 is a flow chart showing the operation of the tracking support terminal 500 according to the first exemplary embodiment of the present invention. Referring to FIG. 9, the tracking support terminal 500 transmits the position information of the own terminal 500 to the support server 100 (Step S201).

Next, the tracking support terminal 500 checks whether or not a predetermined (period of) time passed after the last transmission to the support server 100 (Step S202). Until the predetermined time passes, the tracking support terminal 500 stands by (NO at Step S202). On the other hand, when the predetermined time passed away, the flow returns to the step S201 in order for the tracking support terminal 500 to transmit new information to the support server 100.

As mentioned above, the tracking support terminal 500 transmits its own position information to the support server 100 in a predetermined time interval.

Figure 10:
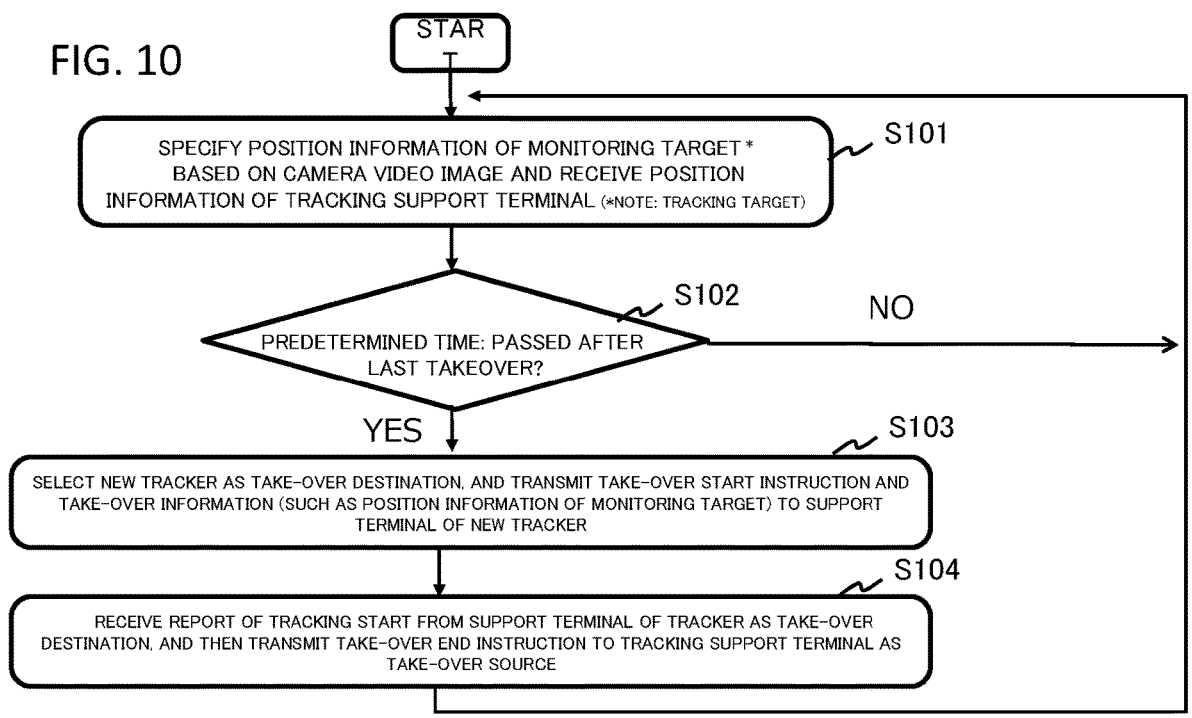
FIG. 10 is a flow chart showing the operation (change processing of the tracker) of the support server according to the first exemplary embodiment of the present invention.

Next, an operation will be described in which the above support server 100 transmits a tracking instruction to the tracking support terminal 500 by using the position of the above tracking target and the position of the tracking support terminal. FIG. 10 is a flow chart showing the operation of the support server 100 according to a first exemplary embodiment of the present invention. Referring to FIG. 10, the support server 100 first specifies the position of the tracking target (may be termed as "monitoring target" herein) from a video image imaged by the camera 200, as described above with reference to FIG. 8. The support server 100 receives the position information of each tracking support terminal 500 from the tracking support terminal 500, as described above with reference to FIG. 9 (Step S101).

Next, the support server 100 checks whether the predetermined time passed away after the last takeover, that is, whether the tracking time of the current tracker exceeded the predetermined time (Step S102).

As the check result, when the tracking time of the current tracker exceeds the predetermined time (YES at Step S102), the support server 100 determines a new tracker as a takeover destination, and transmits a takeover start instruction, and the position information and feature information of the tracking target to the tracking support terminal 500 carried by the new tracker (Step S103).

When receiving a monitoring start notification (to be described later) from the tracking support terminal 500 of the new tracker as the takeover destination, the support server 100 transmits a takeover end instruction to the tracking support terminal 500 of the tracker as a takeover source (Step S104).

At the step S102, when the tracking time of the tracker does not exceed the predetermined time (NO at Step S102), the flow returns to step S101 and the support server 100 continues the reception of new information from the camera 200 and the tracking support terminal 500.

As mentioned above, the support server 100 carries out the operation of changing the tracker who tracks the tracking target, for every predetermined time. "The predetermined time" at the step S102 does not have to be a fixed time. For example, a time obtained by adding a time determined based on a random number to certain time may be used as the predetermined time. That is, it is possible to change the tracker who carries out the monitoring operation, by using a time randomly determined for every time. Thus, it becomes possible to reduce a possibility that the tracking target notices the monitoring. Also, the determination may be carried out, without changing randomly, taking into account the situation that the tracking target is easy to notice the tracker from the attribute of the tracking target (typically, whether the tracking target is a terrorist or a criminal (attentive)), a time zone, a climate condition of a tracking area, a congestion degree in the neighborhood and so on.

Figure 11:
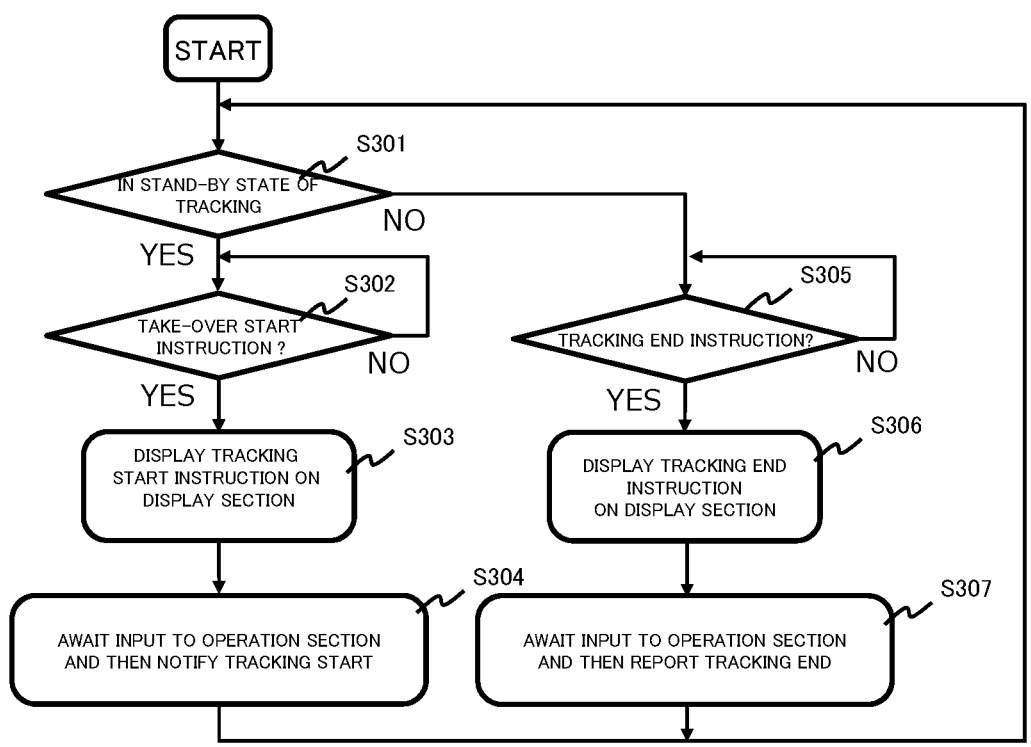
FIG. 11 is a flow chart showing the operation (reception processing of an instruction from the support server) of the tracking support terminal according to the first exemplary embodiment of the present invention.

Subsequently, the operation of the tracking support terminal which receives an instruction from the support server 100 will be described. FIG. 11 is a flow chart showing the operation of the tracking support terminal 500 according to the first exemplary embodiment of the present invention (instruction reception processing from the support server 100). Referring to FIG. 11, when the tracking support terminal 500 is in a stand-by state, i.e. is not used to monitor the tracking target (YES at Step S301), the tracking support terminal 500 displays a tracking start instruction on the display section 504 (Step S303) if receiving a tracking takeover instruction about the tracking target from the support server 100 (YES at Step S302). The tracker sees this display to start the tracking of the tracking target. Then, the tracking support terminal 500 notifies the start of monitoring to the support server 100 (Step S304).

On the other hand, during the tracker carrying the tracking support terminal 500 is in the tracking state, i.e. in monitoring the tracking target (NO at Step S301), the tracking support terminal 500 displays a tracking end instruction on the display section 504 (Step S306) upon receiving the tracking end instruction of the tracking target from the support server 100 (YES at step S305). The tracker views this display to end the tracking of the tracking target, and carries out a predetermined operation to the operation section 507 of the tracking support terminal. Then, the tracking support terminal 500 notifies the end of the tracking to the support server 100 (Step S307).

As mentioned above, the tracker starts or ends the monitoring of a monitoring target person (to be simply referred to as "a monitoring target") according to the instruction from the support server 100 and notifies such effect to the support server 100.

Figure 12:
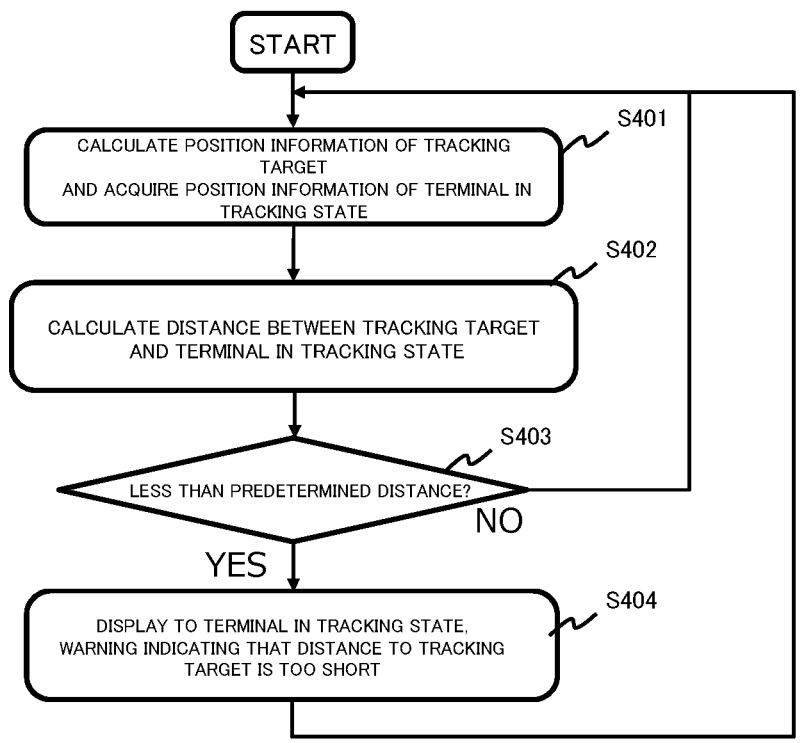
FIG. 12 is a flow chart showing the operation (determination processing of a distance from a tracking target) of the support server according to the first exemplary embodiment of the present invention.

Subsequently, warning processing to the tracker by the support server 100, which processing is carried out independently from the above takeover of the tracking target will be described. FIG. 12 is a flow chart showing an operation of the support server according to the first exemplary embodiment of the present invention (determination processing of a distance to a tracking target). Referring to FIG. 12, the support server 100 first calculates the position information of the tracking target, and acquires the position information of the tracking support terminal 500 carried by the tracker tracking the tracking target from the tracker information managing section 101 (Step S401).

Next, the support server 100 calculates a distance from the tracking support terminal 500 carried by the tracker tracking the tracking target to the tracking target (Step S402).

Next, the support server 100 checks whether or not the calculated distance is less than a predetermined threshold value (Step S403).

When the calculated distance is less than the predetermined threshold value (YES at Step S403), the support server 100 transmits an approach warning to the tracking support terminal 500 carried by the tracker tracking the tracking target to indicate that the distance to the tracking target becomes shortening (or is too short) (Step S404). When the distance calculated at the step S403 exceeds the predetermined threshold value (NO at Step S403), the control flow returns to the step S401 and the support server 100 stands by until the next calculation timing.

Figure 13:
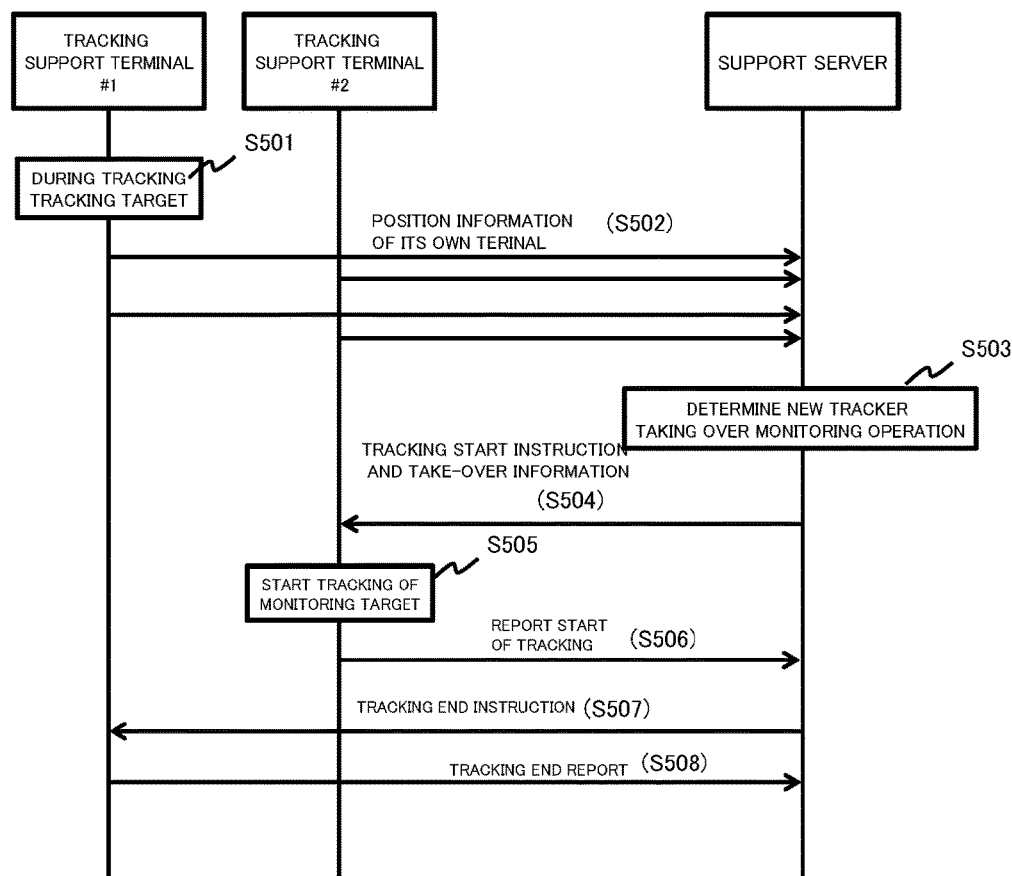
FIG. 13 is a sequence diagram showing a take-over operation to a new tracker according to the first exemplary embodiment of the present invention.

Next, the takeover operation of the tracking target by the support server 100 and the tracking support terminal 500 operating as mentioned above will be described. FIG. 13 is a sequence diagram showing the takeover operation of the tracker according to the first exemplary embodiment of the present invention. Also, in FIG. 13, it is supposed as an initial state that an instruction has been issued to a tracking support terminal #1 so as to monitor the tracking target (Step S501).

The tracking support terminal #1 held by the tracker tracking the tracking target transmits the position information to the support server 100 in a predetermined interval, as described at the step S201 of FIG. 9 (Step S502).

Also, as described at the step S201 of FIG. 9, a tracking support terminal #2 carried by a new tracker in a tracking stand-by state transmits its own position information to the support server 100 in a predetermined interval (Step S502).

The support server 100 determines the new tracker to whom the tracking of the tracking target is to be taken over (Step S503), when a tracking continuation time of the tracker exceeds the predetermined time, as described at the steps S101 and S102 of FIG. 10. In this case, it is supposed that the support server 100 selects the tracking support terminal #2 of another new tracker as a takeover destination.

Then, the support server 100 transmits the following takeover information to the tracking support terminal #2 to instruct the support start for a support object (Step S504):
The tracking start instruction;
Position information of the monitoring target; and
Feature information of the monitoring target.

Receiving the instruction, the tracking support terminal #2 displays the position information and feature information of the tracking target received from the support server 100 on the display section 504 to promote the tracking start to the tracker. When a predetermined tracking start operation is carried out to the operation section 507 of the tracking support terminal #2 by the tracker, the tracking support terminal #2 notifies to the support server 100 that the tracking of the tracking target has been started (Step S506).

Upon receiving the notice of the monitoring start from the tracking support terminal #2, the support server 100 instructs the tracking end of the tracking target (shift to a tracking standby state) to the tracking support terminal #1 (Step S507). Upon receiving the instruction, the tracking support terminal #1 ends the monitoring of the tracking target based on the instruction from the support server 100, and notifies the end of monitoring of the monitoring target to the support server 100 (Step S508).

As mentioned above, according to the first exemplary embodiment of the present invention, it becomes possible to track the tracking target while changing the trackers sequentially in such a manner that the tracking target is difficult to notice the tracker. In the above exemplary embodiment, a case has been described where the number of the trackers tracking the tracking target at a same time is single. However, the tracking may be instructed to a plurality of tracking support terminals of trackers and the takeover may be made to a plurality of trackers.

Also, the role of complementing a part of the above trackers or a mission of the tracker may be achieved by an unmanned aircraft (called "drone"). In this case, the support server 100 transmits a tracking instruction containing the position information and feature information of the monitoring target to the unmanned aircraft in place of the tracking support terminal. In this way, even if the tracker in charge is put in the situation that the tracking is difficult, the tracking can be continued.

Also, in this exemplary embodiment, as described with reference to FIG. 12, an approach warning is issued to the tracker tracking the tracking target when the distance to the tracking target becomes shorter. This approach warning is carried out in a more preferable mode when the tracking support terminal 500 is a wearable terminal.

For example, as shown in FIG. 14, when the tracking support terminal 500 is the wearable terminal of a glass type, an approach warning 901 can be displayed in an information display area of the lens surface. Also, in an example of FIG. 14, when the tracking target is projected into the eyesight of the tracker, a marker 902 showing the tracking target is displayed in superposition. Therefore, the tracker can move to track the tracking target without moving the sight line. In such a situation, when the approach warning 901 is displayed, the tracker can extend the distance to the tracking target by reducing the walking speed or changing a direction of advancing.

Also, as shown in FIG. 15, when the tracking support terminal 500 is the wearable terminal of a watch type, an approach warning 911 can be displayed in an information display area of a main unit 910. Also, in case of the wearable terminal of the watch-type, an example in which the approach warning is outputted in the form of vibration of a vibrator may be adopted in place of the display of the approach warning 911 in the information display area. The tracking support terminal 500 is not limited to the above wearable forms and may be used of a ring type or a wristband type. Of course, a smart phone and so on can be used as the tracking support terminal 500.

Second Exemplary Embodiment

Next, a second exemplary embodiment of the present invention will be described in which an output determination function of the approach warning arranged on the side of the support server 100 in the first exemplary embodiment is arranged on the side of the tracking support terminal. The basic configuration and operation of the second exemplary embodiment are same as those of the first exemplary embodiment. Therefore, difference points between them will be described hereinafter. The support server 100 in the present exemplary embodiment has a function of transmitting the position information of the tracking target that is estimated by the tracking target position estimating section 105, to the tracking support terminal 500. Because the second exemplary embodiment is same as the first exemplary embodiment except for the above fact, the description is omitted.

Figure 16:
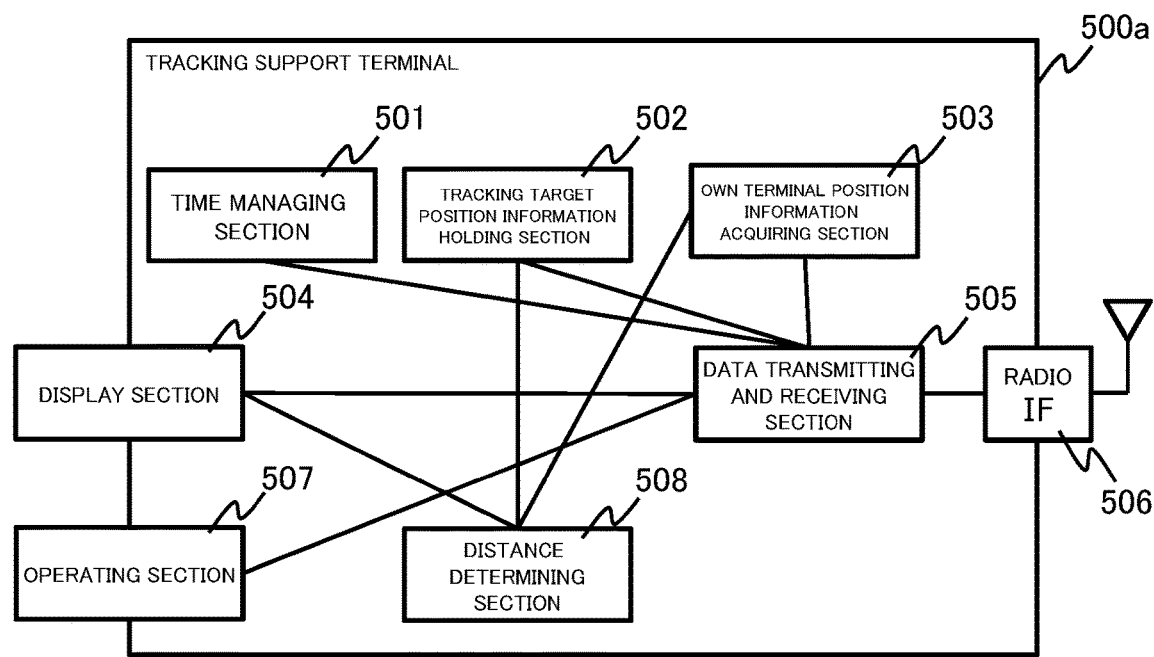
FIG. 16 is a diagram showing the configuration of the tracking support terminal according to a second exemplary embodiment of the present invention.

FIG. 16 is a diagram showing the configuration of a tracking support terminal 500a according to the second exemplary embodiment of the present invention. The difference points from the tracking support terminal 500 according to the first exemplary embodiment shown in FIG. 4 reside in the point that a tracking target position information holding section 502 and a distance determining section 508 are added to the tracking support terminal 500a.

The tracking target position information holding section 502 holds the position information of the tracking target received from the support server 100 for a predetermined time period.

The distance determining section 508 calculates the distance between the tracking target and its own terminal based on the position information of the tracking target received from the support server 100 and the position information of its own terminal. As a result of calculation, when the distance between them is less than the predetermined threshold value, the distance determining section 508 outputs the approach warning to the display section 504.

Figure 17:
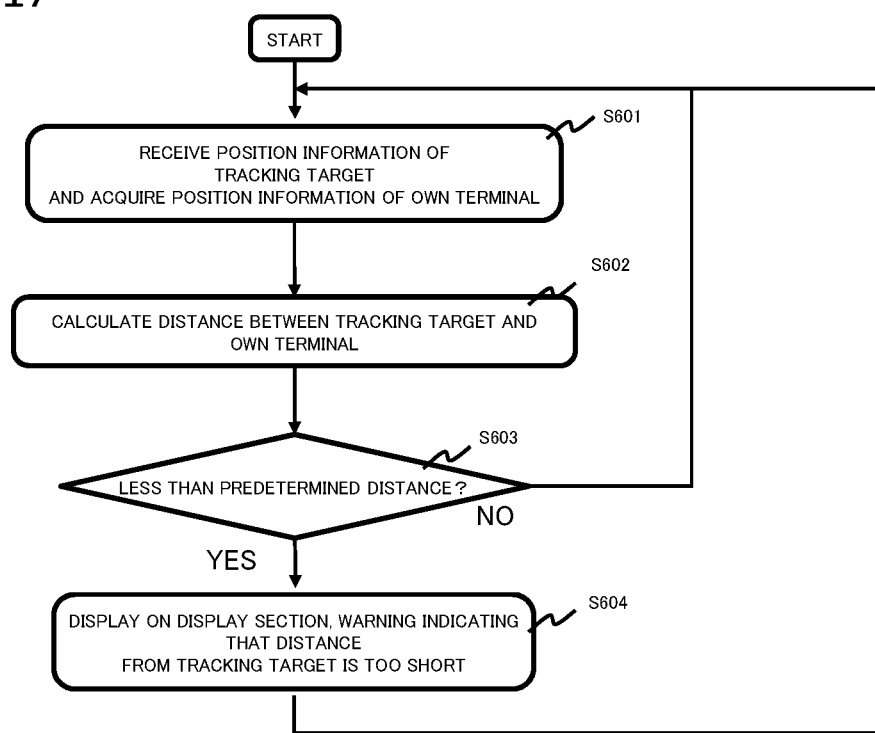
FIG. 17 is a flow chart showing the operation (determination process of a distance from the tracking target) of the tracking support terminal according to the second exemplary embodiment of the present invention.

Next, the output processing of the above approach warning in the tracking support terminal 500a of the present exemplary embodiment will be described. FIG. 17 is a flow chart showing the operation of the tracking support terminal 500a according to the second exemplary embodiment of the present invention (the determination processing of the distance to the tracking target). First, the tracking support terminal 500a reads the position information of the tracking target from the tracking target position information holding section 502. Next, the tracking support terminal 500a acquires the position information of the tracking support terminal 500a carried by the tracker tracking the tracking target from the tracker information managing section 101 (Step S601).

Next, the tracking support terminal 500a calculates the distance between the tracking target and the tracking support terminal 500a carried by the tracker tracking a tracking target (Step S602).

Next, the tracking support terminal 500a checks whether or not the calculated distance is less than the predetermined threshold value (Step S603).

When the calculated distance is less than the predetermined threshold value (YES at Step S603), the tracking support terminal 500a displays on the display section 504, the approach warning showing that the distance to the tracking target is shortening (too short) (Step S604). When the distance calculated at the step S603 is more than the predetermined threshold value (NO at Step S603), the control flow returns to the step S601 and the tracking support terminal 500a stands by until the next calculation timing.

As mentioned above, the configuration of the present invention may be modified such that the distance between the tracker and the tracking target is calculated on the side of the tracking support terminal 500a and the approach warning is outputted according to need.

Third Exemplary Embodiment

Next, a third exemplary embodiment of the present invention will be described in which a search function is added to be used when the tracker loses sight of the tracking target (hereinafter, this situation is called a "monitoring failure", containing a case of the tracking target escaping from the tracker and a case of the tracker noticing tracking of a wrong tracking target). The basic configuration and operation of the third exemplary embodiment are same as those of the first and second exemplary embodiments. Therefore, the different points will be mainly described hereinafter.

Figure 18:
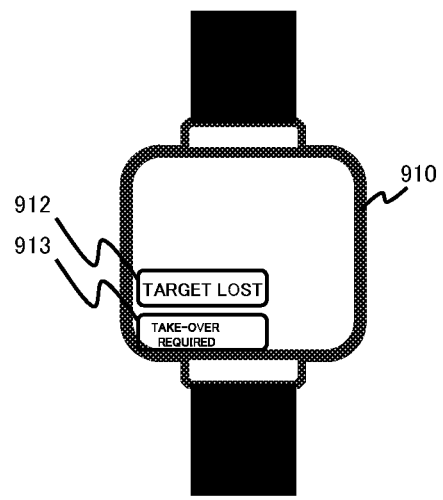
FIG. 18 is a diagram showing an example of buttons provided for the tracking support terminal according to a third exemplary embodiment of the present invention.

The tracking support terminal of the present exemplary embodiment has a function of informing the monitoring failure of the tracking target by the tracker to the support server 100. FIG. 18 is a diagram showing an example of operation section 507 provided for the tracking support terminal of a watch type in the third exemplary embodiment of the present invention. In the example of FIG. 18, a "target lost" button 912 indicating the loss of sight of the target and a "takeover request" button 913 which requests a takeover to another tracker based on some reason are independently provided. For example, when the tracker clicks the "target lost" button 912, a message showing that the tracker lost the sight of the target is transmitted to the support server. In the same way, when the tracker clicks the "takeover request" button 913, a message showing that the tracker requests the takeover of the tracking to a new tracker is transmitted to the support server. In an example of FIG. 18, the "target lost" button 912 and the "takeover request" button 913 are displayed separately (independently) on a touch panel of the tracking support terminal of the watch type. However, by integrating both of functions of the buttons, a new button may be provided to request a type of support to the support server. Also, functions corresponding to these buttons may be allocated to mechanical buttons provided for the wearable terminal.

Figure 19:
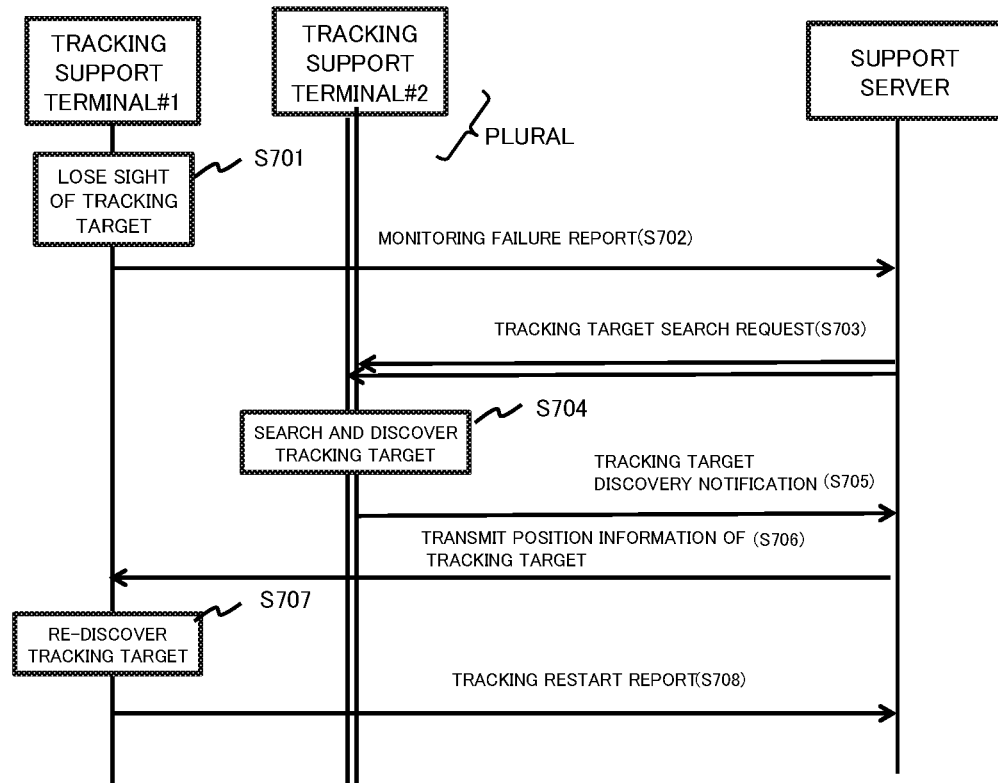
FIG. 19 is a sequence diagram showing a take-over operation to a new tracker according to the third exemplary embodiment of the present invention.

FIG. 19 is a sequence diagram showing a function added to the third exemplary embodiment of the present invention. The sequence of FIG. 19 shows a search operation of the tracking target carried out when the support server 100 having received a monitoring failure report from the tracker cannot find the tracking target from video image data from the camera 200. Referring to FIG. 19, when noticing loss of sight of the tracking target, the tracker first clicks the "target lost" button 912 of FIG. 18 (Step S701), to report the monitoring failure to the support server 100 (Step S702). The position information (monitoring failure position) and time (monitoring failure time) in which the tracking target was confirmed last, or the feature information may be contained in this report (monitoring failure report).

Receiving the monitoring target report, the support server 100 selects a new tracker based on the position information where the tracker confirmed the tracking target last, and transmits the search request of the tracking target to the tracking support terminals #2 of these trackers (Step S703). The position information where the tracking target was last confirmed and past feature information showing a disguise history may be included in the search request of tracking target in addition to the feature information of the tracking target. In case of receiving the monitoring failure report at the step S702, when the support server 100 can find the tracking target from the video image data from the camera 200, the steps S703 to S705 can be omitted. In this case, the support server 100 transmits the tracking target position information specified by the camera 200 and so on to the tracking support terminal #1, and requests re-monitoring of the tracking target (Step S706).

Receiving the search request of the tracking target, the tracker searches the tracking target based on the feature information of the tracking target contained in the search request of the tracking target (Step S704). In the example of FIG. 19, as a result of the search of the tracking target, it is supposed that the tracker(s) holding the tracking support terminal(s) #2 discovers the tracking target.

Discovering the tracking target, the tracker operates the tracking support terminal #2 to notify the discovering of the tracking target to the support server 100 (Step S705). The position information showing the position where the tracking target has been discovered and the feature information are contained in the notice according to need.

Receiving the position information of the tracking target and so on, the support server 100 transmits the position information of the tracking target and so on to the tracking support terminal #1 to request the re-monitoring of the tracking target (Step S706). When discovering the tracking target again (Step S707), the tracker operates the tracking support terminal #1 to notify the discovery of the tracking target and the re-start of the tracking to the support server 100 (Step S708).

As mentioned above, according to the present exemplary embodiment, it becomes possible for the tracker to deal with a case of losing sight of the tracking target, from the reasons that the tracking target changes clothes, disguises oneself and disappears intentionally from the eyesight of the unmanned aircraft. Especially, as shown in FIG. 18, by providing the "target lost" button 912 independently, it is possible to report the loss of sight to the support server 100 promptly after losing the sight of the tracking target.

In the above exemplary embodiment, the description is made in which the support server 100 selects the tracking support terminal based on the position information where the tracker carrying the tracking support terminal #1 confirmed the tracking target last. However, a modification may be made so that the support server 100 broadcasts a search request of the tracking target to all the subordinate tracking support terminals. Even in this case, the position information where the tracker #1 confirmed the tracking target last may be contained in the search request of the tracking target. In this way, each tracker can search the tracking target again based on a position and a feature when the tracker #1 confirmed the tracking target last.

In the above exemplary embodiment, the support server 100 instructs the tracker carrying the tracking support terminal #1 to restart the tracking. However, when the position relation between the tracker #1 and the tracking target is not appropriate as the result that the tracking target moves greatly, the control flow advances to the step S103 of FIG. 10, and the selection of the tracker to which the takeover is to be carried out may be made.

Fourth Exemplary Embodiment

Next, a fourth exemplary embodiment of the present invention will be described in which a function of requesting to stop the tracking is added to the tracking support terminal. The basic configuration and operation of the fourth exemplary embodiment are same as those of the first and second exemplary embodiments. Therefore, the difference points are mainly described hereinafter.

Figure 20:
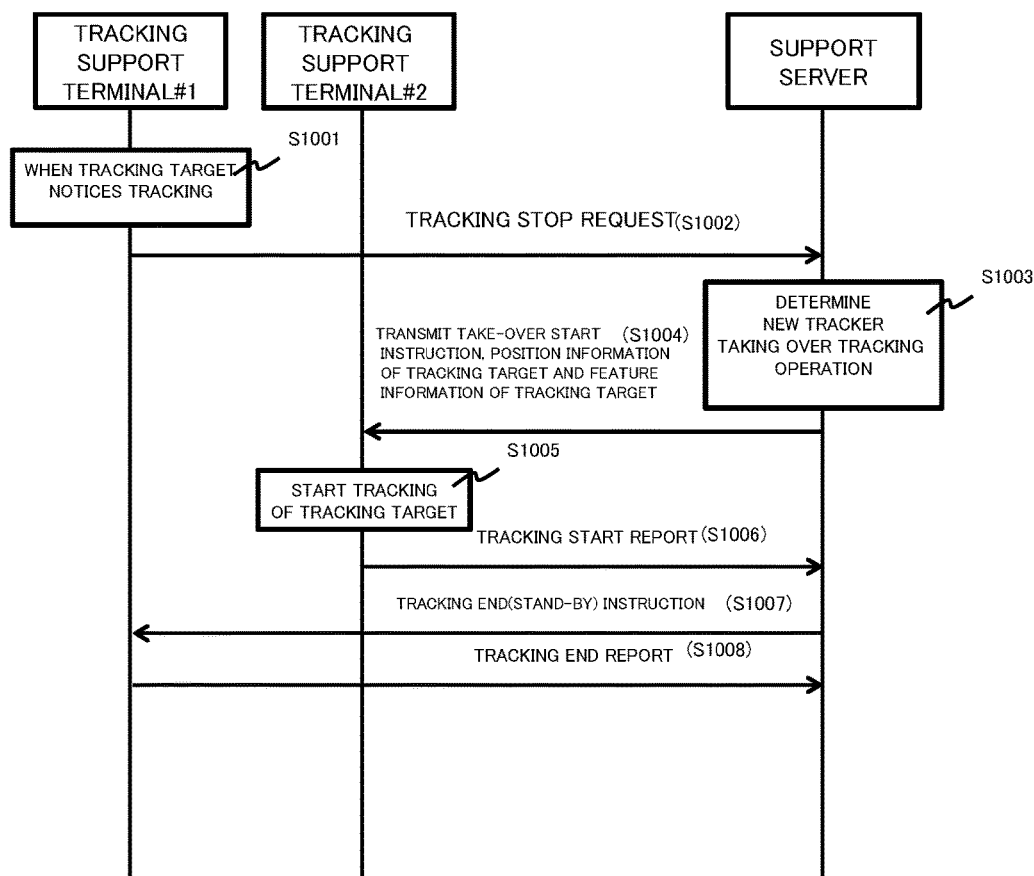
FIG. 20 is a sequence diagram showing the take-over operation to the new tracker according to a fourth exemplary embodiment of the present invention.
Figure 21:
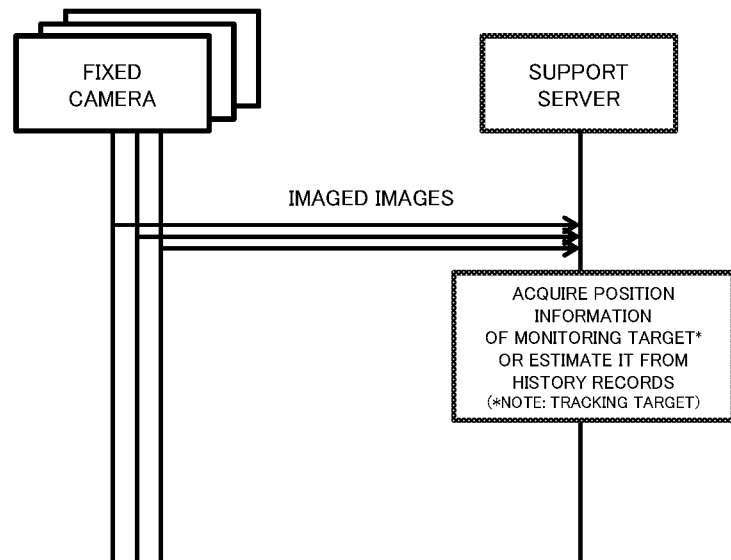
FIG. 21 is a sequence diagram showing the operations of a fixation camera and the support server according to an exemplary embodiment.

FIG. 20 is a sequence diagram showing the function added to the fourth exemplary embodiment of the present invention. Referring to FIG. 20, when the reason that the tracking of the tracking target should be stopped occurs (Step S1001), the tracker carrying the tracking support terminal #1 first transmits a tracking stop request (tracking end request) to the support server 100 (Step S1002). The position information where the tracking target has been confirmed last and the reason that the tracking of the tracking target should be stopped may be included in the tracking stop request (the tracking end request).

As the reasons that the tracking of the tracking target should be stopped, the following reasons are thought of:
  a case where the tracking target notices the tracking;
  a case where the tracking target enters an area where it is difficult for the tracker to track the tracking target;
  a case where a different command is received; and
  a case where the safety of the tracker should be secured for the reason of the fatigue or injury of the tracker.

Upon receiving the tracking stop request (the tracking end request), the support server 100 determines a new tracker to take over the tracking of the tracking target (Step S1003). In this case, it is supposed that the support server 100 selects the tracker carrying the tracking support terminal #2 as the takeover destination.

The support server 100 transmits the following information to the tracking support terminal #2 to instruct a tracking start of the tracking target (Step S1004):
  A takeover start instruction;
  Position information of the tracking target; and
  Feature information of the tracking target.

The tracker having the tracking support terminal #2 which has received the instruction, starts the tracking of the tracking target based on the position information and feature information of the tracking target which have been received from the support server 100 (Step S1005). The tracking support terminal #2 notifies a start of the monitoring of the tracking target to the support server 100 (Step S1006). The notification of the start of the monitoring of the tracking target may be transmitted in response to an explicit operation from the tracker having the tracking support terminal #2, or may be transmitted automatically based on the start of the monitoring the tracking target by the tracking support terminal #2.

Receiving the notification of the monitoring start from the tracking support terminal #2, the support server 100 instructs the tracking end of the tracking target (a shift to the tracking standby state) to the tracking support terminal #1 (Step S1007). Receiving the instruction, the tracker having the tracking support terminal #1 ends the tracking of the tracking target based on the instruction received from the support server 100, and notifies the end of the tracking of the tracking target to the support server 100 (Step S1008).

As mentioned above, according to the present exemplary embodiment, when a situation to stop the tracking has occurred on the side of tracker, it is possible for the monitoring to be promptly taken over to another tracker.

As described above, each exemplary embodiment of the present invention has been described. However, the present invention is not limited to the above exemplary embodiments, and further modification, substitution and adjustment can be applied in a range which does not deviate from the basic technical thought of the present invention. For example, a network configuration, the configuration of each element, the expression form of information element and so on shown in each drawing are only an example to help the understanding of the present invention, and are not limited to the configuration shown in these drawings.

Lastly, preferred modes of the present invention are summarized as follows:

[First Mode]
(Reference to a tracking support apparatus according to the above first aspect.)
[Second Mode]
In the above tracking support apparatus,
it is preferred that information relating to a distance between the terminal and the tracking target is an approach warning to be transmitted when the distance between the terminal and the tracking target becomes shorter than a predetermined threshold value.
[Third Mode]
In the above tracking support apparatus,
a configuration can be adopted in which, when a tracking time of the tracking target by a tracker exceeds a predetermined time, a tracker selecting section selects another tracker from among the plurality of trackers, and instructs the tracking of the tracking target to a terminal of the selected another tracker, and instructs an end of the tracking of the tracking target to the tracker.
[Fourth Mode]
In the above tracking support apparatus,
a time determined randomly at any occurrence can be used as the predetermined time.
[Fifth Mode]
The above tracking support apparatus can adopt a configuration in which the tracker selecting section selects another tracker from among the plurality of trackers when receiving a tracking end request from the tracker, and the information transmitting section instructs the tracking of the tracking target to a terminal of the other tracker and instructs the end of the tracking of the tracking target to the terminal of the tracker.

[Sixth Mode]
In the above tracking support apparatus, when the tracking end request from the tracker is based on a monitoring failure, it is preferred to transmit information of the tracking target to the plurality of trackers and to instruct search of the tracking target.
[Seventh Mode]
(Reference to the terminal according to the above second aspect.)
[Eighth Mode]
It is preferred that the terminal has a button(s) to transmit a tracking end request to the tracking support apparatus.
[Ninth Mode]
In the above terminal, it is preferred that a button used to notify a monitoring failure to the tracking support apparatus and a button used to notify that the tracking target noticed the tracking, to the tracking support apparatus are provided independently as the buttons.
[Tenth Mode]
(Reference to the tracking support method according to above third aspect.)
[Eleventh Mode]
A program which makes a computer installed in a tracking support apparatus which is connected with a plurality of cameras arranged in a predetermined monitoring area to transmit video images imaged by the plurality of cameras, and configured to transmit instructions to a tracker carrying a terminal based on information received from the plurality of cameras and terminals respectively carried by a plurality of trackers, execute:
  processing of calculating a position of a tracking target based on the video images received from the plurality of cameras;
  processing of selecting a tracker tracking the tracking target, based on position information of the terminal received from the terminal and the calculated position of the tracking target; and
  processing of transmitting information of a distance between the tracking target and the terminal carried by the tracker tracking the tracking target, to the terminal of the selected tracker.
[Twelfth Mode]
A program which makes a computer, which is loaded in a terminal configured to receive an indication of a tracking target from a support apparatus which transmits an instruction to a tracker carrying the terminal, based on information received from a plurality of cameras which are arranged in a predetermined monitoring area and transmit video images by the cameras, to execute:
  processing of calculating a distance between the terminal and the tracking target based on a position of the tracking target received from the support apparatus and a position of the terminal, and
  processing of outputting information of the calculated distance.

Note that the above-mentioned seventh and tenth to twelfth modes can be developed into the second to sixth modes, like the first mode.

In the disclosure of the present invention, the following modes, too, are possible.
Solutions:
  A tracking support system that provides a support when tracking a monitoring target while changing the tracker(s) among a plurality of trackers, includes:
    a plurality of cameras which take a monitoring area, a tracking support terminal which is carried by a tracker, and a support server which is connected with the plurality of cameras and a plurality of tracking support terminals through a communication network, the cameras transmit video images in the monitoring area to the support server through the communication network, the tracking support terminal transmits position information of its own terminal to the support server through the communication network, and the support server selects a next tracker to carry out the tracking to notify to the tracking support terminal based on the position information of the tracking support terminal and position information of the monitoring target specified based on the video images of the cameras or position information of the monitoring target estimated from history records.

Advantages:

The monitoring target becomes difficult to notice the monitoring so that a possibility to take an action running away from the monitoring reduces since it is difficult for the tracker to lose sight of the monitoring target at a change of a tracker, and the recovery upon losing sight is easy, or it becomes possible to carry out the tracking in an appropriate distance.

Figure 22:
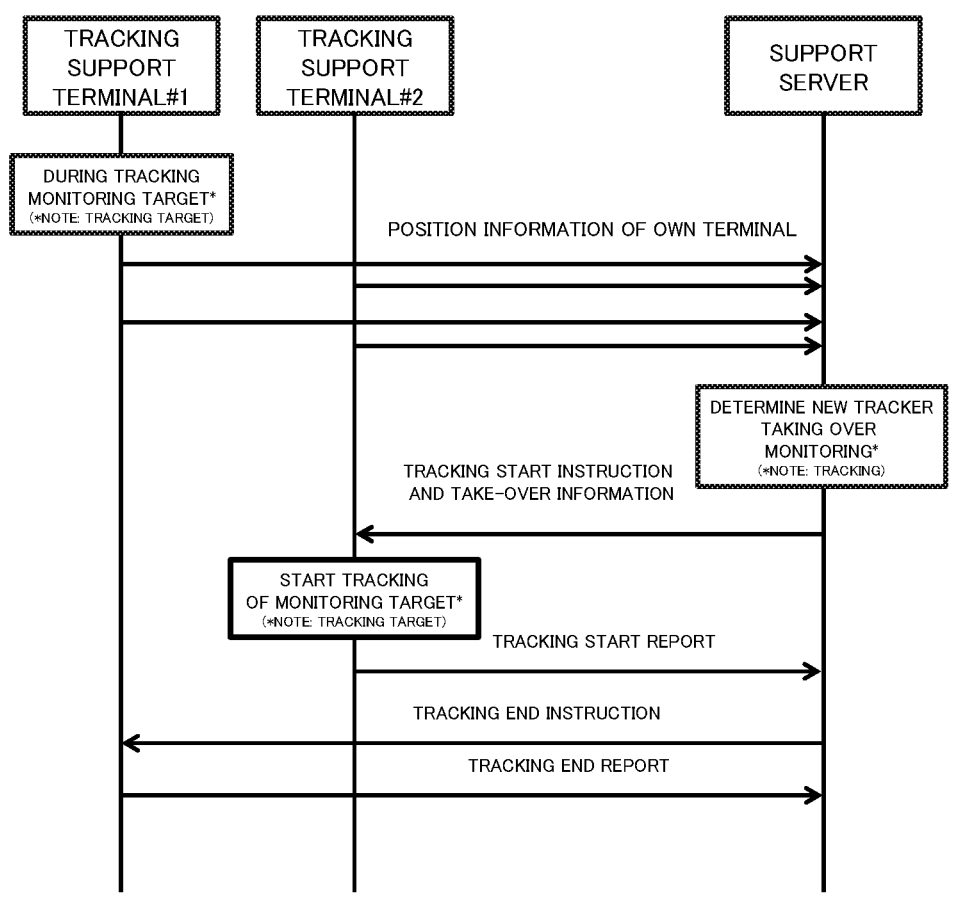
FIG. 22 is a sequence diagram showing the operations of the tracking support terminal and the support server according to an exemplary embodiment.
Figure 23:
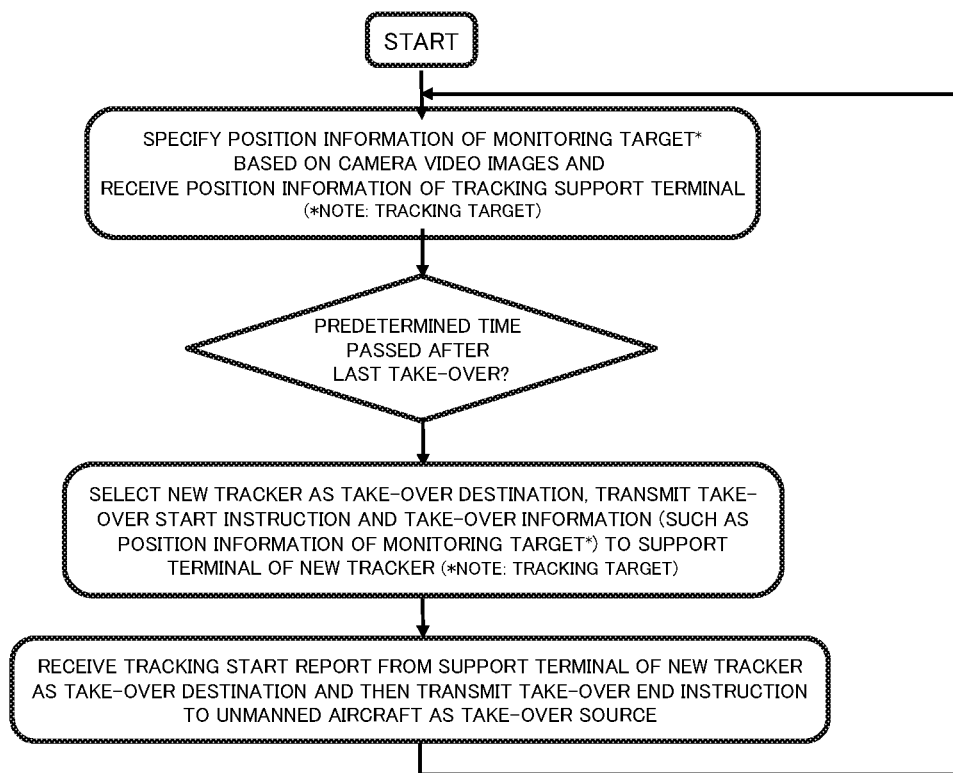
FIG. 23 is a flow chart showing the operation of the support server according to the exemplary embodiment.
Figure 24:
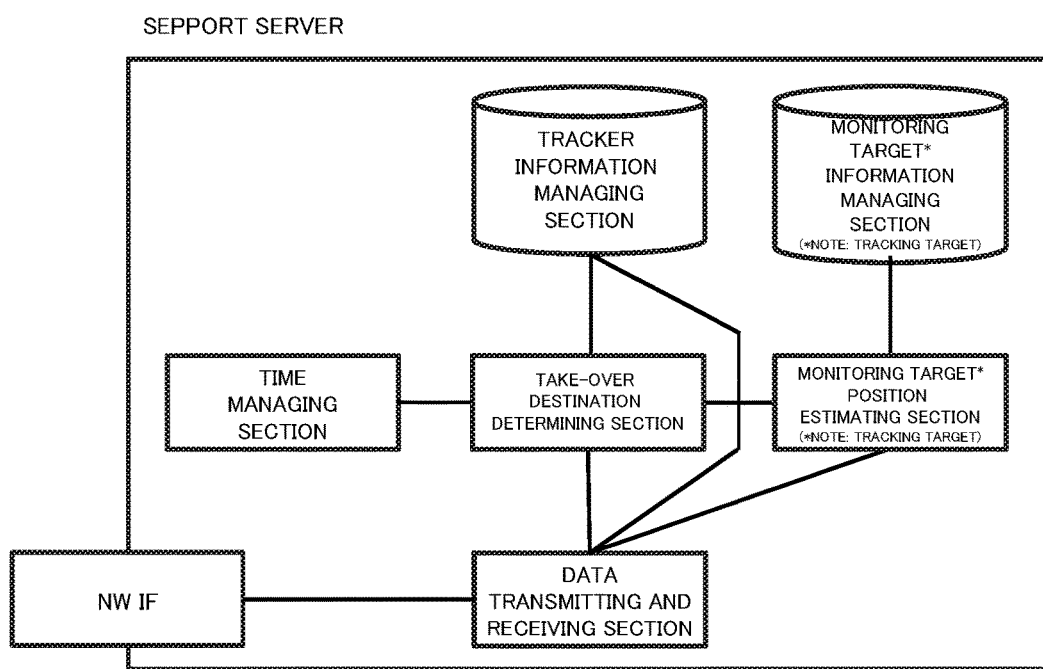
FIG. 24 is a functional block diagram of the support server according to an exemplary embodiment.
Figure 25:
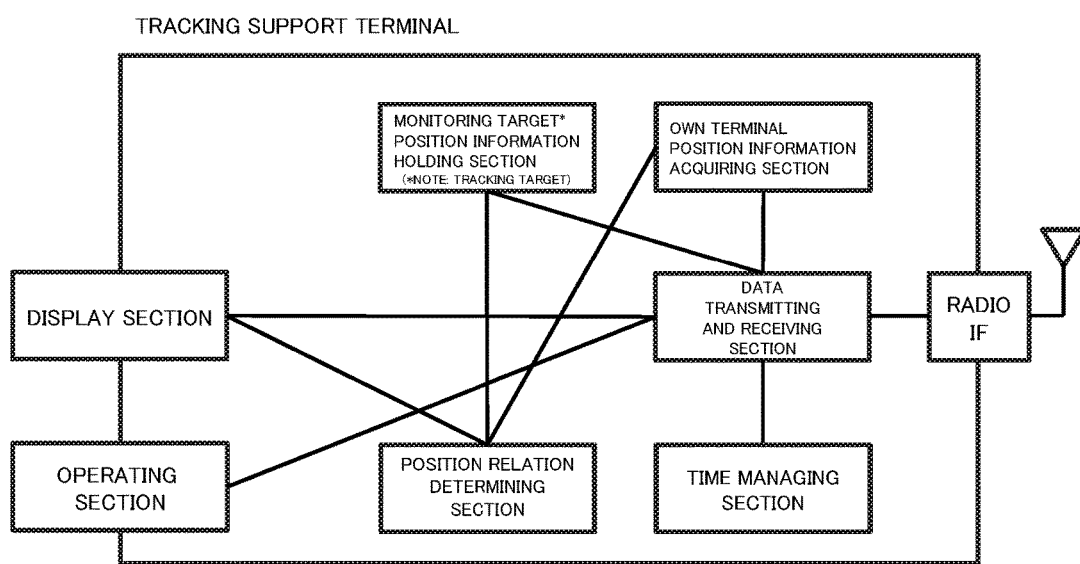
FIG. 25 is a functional block diagram of the tracking support terminal according to an exemplary embodiment.

In FIG. 22, as an example of a method of determining a new tracker to take over the monitoring, the following methods are given:

a new tracker is randomly selected from among trackers having support terminals moving within a predetermined radius from a current position of the monitoring target; and a new tracker is randomly selected from among trackers having support terminals moving within a predetermined radius from a place where the monitoring target estimated as likely to move in a predetermined time based on action history records of the monitoring target.

Upon selecting, personal features of the tracker e.g., physiognomy such as sexuality, physique, clothes, ornament and wear or the like, walking speed of the tracker and a periphery situation (degree of congestion) may be taken into account.

When the tracker changes from an office worker style to an old person style, tracking of the tracking target becomes difficult to be noticed. The moving speed reduces if crowded.

Figure 26:
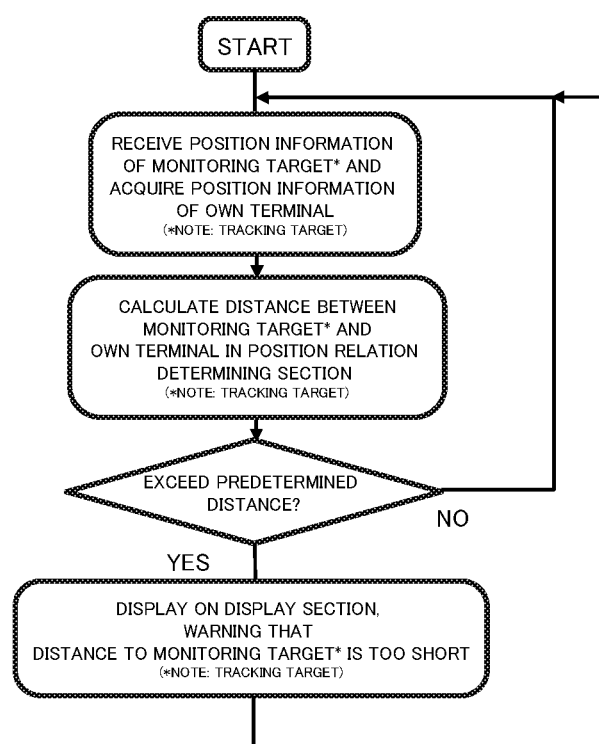
FIG. 26 is a flow chart showing another operation of the tracking support terminal according to an exemplary embodiment.
Figure 27:
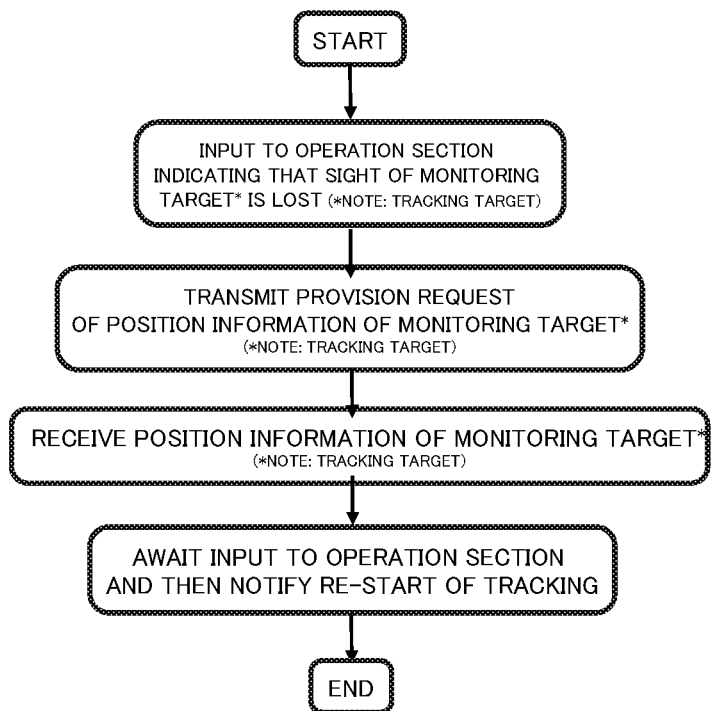
FIG. 27 is a flow chart showing another operation of the tracking support terminal according to an exemplary embodiment.
Figure 28:
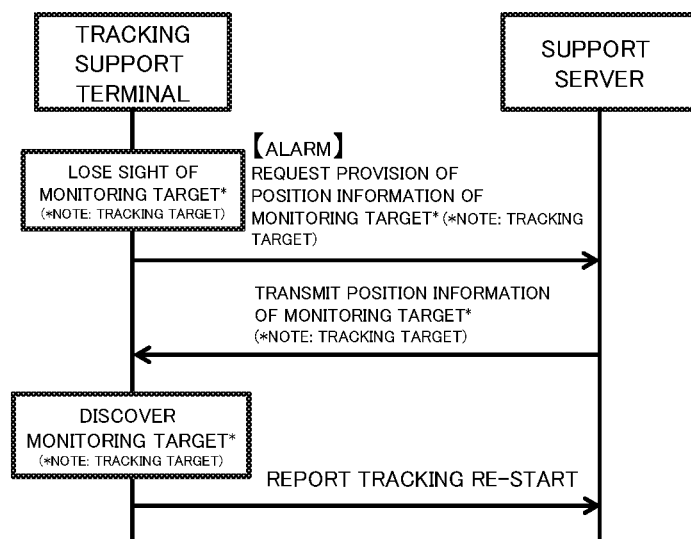
FIG. 28 is a sequence diagram showing the operations of the fixation camera and the support server according to an exemplary embodiment.
Figure 29:
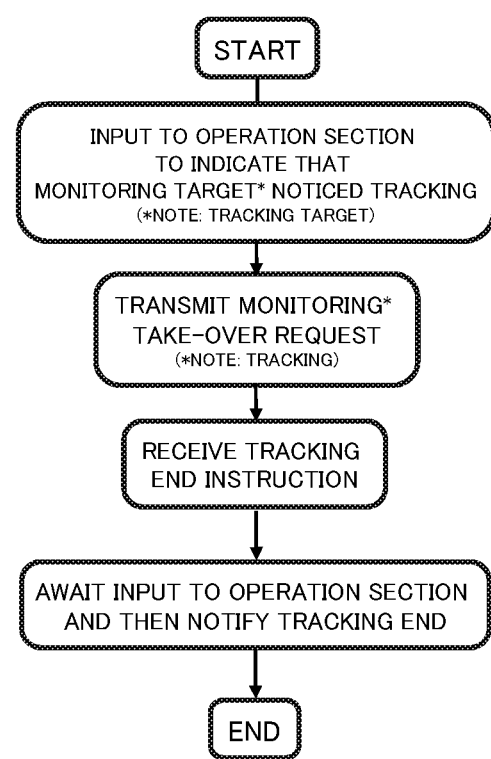
FIG. 29 is flow chart showing another operation of the tracking support terminal according to an exemplary embodiment.

Also, in a determination block of FIG. 26, the predetermined distance may be changed according to a periphery situation. For example, when a degree of congestion is high, it is thought that a possibility that the monitoring target notices the monitoring is low, even if approaching the monitoring target.

Figure 30:
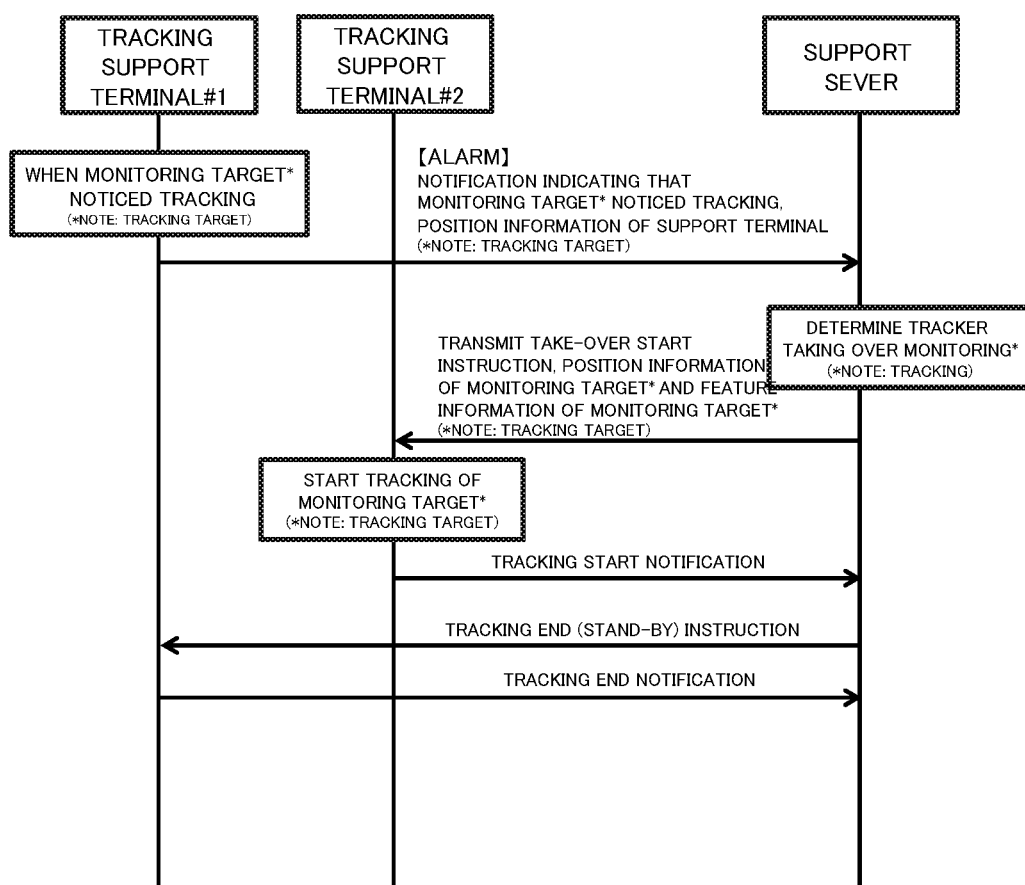
FIG. 30 is a sequence diagram showing the operations of a fixation camera and a support server according to an exemplary embodiment.

Also, in FIG. 30, there are a photograph, physique and clothes of the monitoring target as an example of the monitoring target information.

Figure 31:
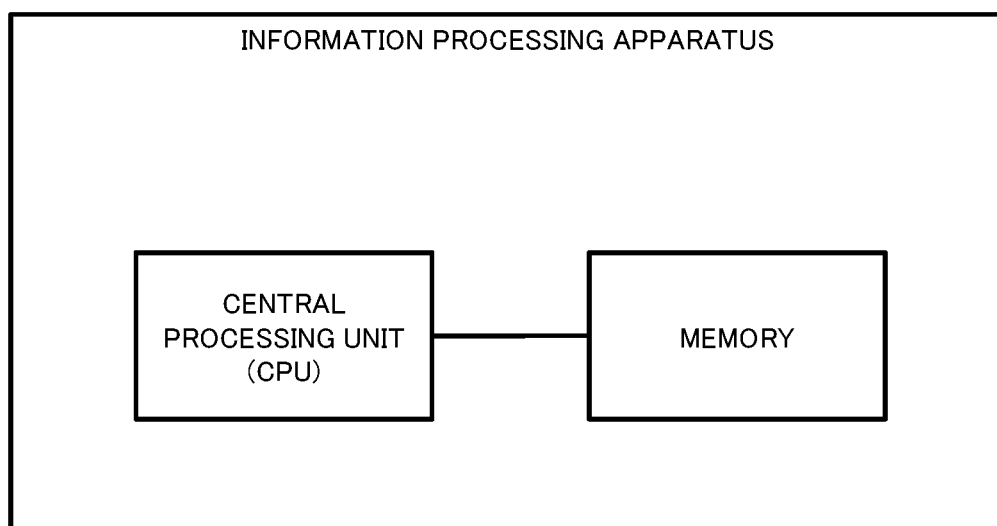
FIG. 31 is a block diagram exemplifying the configuration of an information processing apparatus according to an exemplary embodiment.

FIG. 31 is a block diagram which exemplifies a configuration of an information processing apparatus. An analysis server according to an exemplary embodiment may have an information processing apparatus shown in the above figure. The information processing apparatus has a central processing unit (CPU) and a memory. The information processing apparatus may realize part or whole of function of each section of the analysis server by the CPU executing a program stored in the memory.

Mode 1:

A tracking support system that provides a support when tracking a monitoring target while changing a tracker among a plurality of trackers, includes:

a plurality of cameras which take a monitoring area, a tracking support terminal which is carried by a tracker, and a support server which is connected with the plurality of cameras and a plurality of tracking support terminals through a communication network, wherein the cameras transmit video images in the monitoring area to the support server through the communication network, wherein the tracking support terminal transmits position information of its own terminal to the support server through the communication network, and wherein the support server selects a next tracker tracking the monitoring target to notify to the tracking support terminal based on the position information of the tracking support terminal and position information of the monitoring target specified based on the video images from the cameras or position information of the monitoring target estimated from records.

Mode 2:

The tracking support system of mode 1, characterized in that the support server has a NW IF, a data transmitting and receiving section, a monitoring target position estimating section, a tracking target information storing section, a tracker information managing section, a time managing section, and a takeover destination determining section.

Mode 3:

The tracking support system of mode 1 or 2, characterized in that each of the plurality of tracking support terminals includes a radio IF, a display section, an own terminal position information acquiring section, a monitoring target position information holding section, a time managing section, a position relation determining section, a data transmitting and receiving section and an operating section.

Mode 4:

The tracking support system according to any one of modes 1 to 3, characterized in that the plurality of tracking support terminals report provision requests of the position information of the monitoring target to the support server, when receiving an input of having missed the monitoring target to the operation section, that the support server notifies the position information of the monitoring target to the tracking support terminal of a requesting source, and that the tracking support terminal of the requesting source displays the notified position information of the monitoring target on the display section.

Mode 5:

The tracking support system according to any one of modes 1 to 4, characterized in that the plurality of tracking support terminals calculate the position relation of the tracker and the monitoring target based on the position information of its own terminal and the position information of the monitoring target, and displays a warning on the display section of the tracking support terminal when the distance exceeds a predetermined distance (an upper limit and a lower limit).

It is possible to modify and adjust the exemplary embodiments and exemplifications in a range of the whole disclosure of the present invention (containing claims) based on the basic technical thought. Also, it is possible to combine and select various disclosed elements (containing each element of each claim, each element of each exemplary embodiment or each exemplification and each element of each drawing and so on) in the disclosure of the present invention. That is, of course, the present invention contains various modifications and changes which will be possible to be attained by a skilled person according to the entire disclosure including claims and the technical thought. Especially, a numerical value range described in the Description and Claims should be interpreted as being specifically described even when an optional numerical value or a small range is not specified particularly.

REFERENCE SIGNS LIST 10A, 200: camera
20A: tracking support apparatus
21A: position calculating section
22A: tracker selecting section
23A: information transmitting section
100: support server
101: tracker information managing section
102: tracking target information managing section
103: time managing section
104: takeover destination determining section
105: tracking target position estimating section
106: network interface (network IF)
107: data transmitting and receiving section
108: distance determining section
500, 500a: tracking support terminal
501: time managing section
502: tracking target position information holding section
503: own terminal position information acquiring section
504: display section
505: data transmitting and receiving section
506: radio interface (radio IF)
507: operation section
508: distance determining section
900, 910: (wearable terminal) main unit
902: marker
901, 911: approach warning
912, 913: button

The invention claimed is:

1. A tracking support apparatus comprising:
a receiver configured to receive position information of a plurality of terminals, each one of the plurality of terminals being carried by a tracker, and receive confirmation position information of a terminal of a tracker instructed to track a tracking target and a notification of a monitoring failure from the terminal of the tracker, the confirmation position information indicating a position where the tracker confirms the tracking target;
a tracker selecting section configured to select a takeover tracker instructed to search the tracking target, using the position information of the plurality of terminals and the confirmation position information indicating the position where the tracker confirms the tracking target last, when the notification of the monitoring failure is received; and
an information transmitting section configured to transmit a search request to search the tracking target to a takeover terminal of the takeover tracker,
wherein the receiver is configured to receive, from the terminal of the tracker, a notification that the tracker requests takeover of the tracking of the tracking target to a new tracker, independently from notification of the monitoring failure.

2. The tracking support apparatus according to claim 1, wherein the receiver is configured to receive, from the takeover terminal, a discovery notification including the position information of the tracking target, and
wherein the information transmission section is further configured to, upon reception of the discovery notification by the receiver, transmit the position information of the tracking target included in the discovery notification to the terminal of the tracker.

3. The tracking support apparatus according to claim 2, wherein the discovery information includes feature information of the tracking target.

4. The tracking support apparatus according to claim 2, wherein the tracker selecting section is configured to select a new takeover tracker instructed to track the tracking target, using the position information of the plurality of terminals and the position information of the tracking target, when the discovery information is received and a position relation between the selected tracker and a target position is determined to be not appropriate, the target position being indicated by the position information of the tracking target included in the discovery notification.

5. The tracking support apparatus according to claim 1, the apparatus further comprising a position calculating section configured to calculate a position of the tracking target using video images received from a plurality of cameras, the position calculating section being connected with the plurality of cameras arranged in a predetermined monitoring area to transmit video images taken by the plurality of cameras,
wherein the tracker selecting section is configured to select the tracker to be instructed to track the tracking target, using the position information of the plurality of terminals and the calculated position of the tracking target, and
wherein the information transmitting section is configured to transmit information of a distance between the tracking target and the terminal of the selected tracker during tracking of the tracking target to the terminal of the selected tracker.

6. A tracking support method by a tracking support apparatus, the method comprising:
receiving position information of a plurality of terminals, each one of the plurality of terminals being carried by a tracker;
receiving confirmation position information of a terminal of a tracker instructed to track a tracking target and a notification of a monitoring failure form the terminal of the tracker, the confirmation position information indicating a position where the tracker confirms the tracking target;
selecting a takeover tracker instructed to search the tracking target, using the position information of the plurality of terminals and the confirmation position information indicating the position where the tracker confirms the tracking target last, when the notification of the monitoring failure is received;
transmitting a search request to search the tracking target to a takeover terminal of the takeover tracker; and
receiving, from the terminal of the tracker, a notification that the tracker requests takeover of the tracking of the tracking target to a new tracker, independently from notification of the monitoring failure.

7. The tracking support method according to claim 6, the method further comprising:
receiving, from the takeover terminal, a discovery notification including the position information of the tracking target; and
transmitting the position information of the tracking target included in the discovery notification to the terminal of the tracker.

8. The tracking support method according to claim 7, wherein the discovery information includes feature information of the tracking target.

9. The tracking support method according to claim 7, the method further comprising selecting a new takeover tracker instructed to track the tracking target, using the position information of the plurality of terminals and the position information of the tracking target, when the discovery information is received and a position relation between the selected tracker and a target position is determined to be not appropriate, the target position being indicated by the position information of the tracking target included in the discovery notification.

10. The tracking support method according to claim 6, the method further comprising:
calculating a position of the tracking target using video images received from a plurality of cameras, the position calculating section being connected with the plurality of cameras arranged in a predetermined monitoring area to transmit video images taken by the plurality of cameras;
selecting the tracker instructed to track the tracking target, using the position information of the plurality of terminals and the calculated position of the tracking target; and
transmitting information of a distance between the tracking target and the terminal of the selected tracker during tracking of the tracking target to the terminal of the selected tracker.

11. A non-transitory computer readable medium storing a program causing a computer to execute processing comprising:
receiving position information of a plurality of terminals, each one of the plurality of terminals being carried by a tracker;
receiving confirmation position information of a terminal of a tracker instructed to track a tracking target and a notification of a monitoring failure form the terminal of the tracker, the confirmation position information indicating a position where the tracker confirms the tracking target;
selecting a takeover tracker instructed to search the tracking target, using the position information of the plurality of terminals and the confirmation position information indicating the position where the tracker confirms the tracking target last, when the notification of the monitoring failure is received;
transmitting a search request to search the tracking target to a takeover terminal of the takeover tracker; and
receiving, from the terminal of the tracker, a notification that the tracker requests takeover of the tracking of the tracking target to a new tracker, independently from notification of the monitoring failure.

12. The non-transitory computer readable medium according to claim 11, storing the program causing the computer to execute processing comprising:
receiving, from the takeover terminal, a discovery notification including the position information of the tracking target; and
transmitting the position information of the tracking target included in the discovery notification to the terminal of the tracker.

13. The non-transitory computer readable medium according to claim 12, wherein the discovery information includes feature information of the tracking target.

14. The non-transitory computer readable medium according to claim 12, storing the program causing the computer to execute processing comprising selecting a new takeover tracker instructed to track the tracking target, using the position information of the plurality of terminals and the position information of the tracking target, when the discovery information is received and a position relation between the selected tracker and a target position is determined to be not appropriate, the target position being indicated by the position information of the tracking target included in the discovery notification.

15. The non-transitory computer readable medium according to claim 12, storing the program causing the computer to execute processing further comprising:
calculating a position of the tracking target using video images received from a plurality of cameras, the position calculating section being connected with the plurality of cameras arranged in a predetermined monitoring area to transmit video images taken by the plurality of cameras;
selecting the tracker instructed to track the tracking target, using the position information of the plurality of terminals and the calculated position of the tracking target; and
transmitting information of a distance between the tracking target and the terminal of the selected tracker during tracking of the tracking target to the terminal of the selected tracker.

* * * * *